United States Patent
Jablonski

(10) Patent No.: US 11,945,492 B2
(45) Date of Patent: Apr. 2, 2024

(54) ROLLING FOLDING FRAME WITH SIMULTANEOUSLY DEPLOYABLE HANDLE AND WHEELBASE

(71) Applicant: Krzysztof Michal Jablonski, Englewood, CO (US)

(72) Inventor: Krzysztof Michal Jablonski, Englewood, CO (US)

( * ) Notice: Subject to any disclaimer, the term of this patent is extended or adjusted under 35 U.S.C. 154(b) by 0 days.

(21) Appl. No.: 18/459,872

(22) Filed: Sep. 1, 2023

(65) Prior Publication Data

US 2024/0075976 A1 Mar. 7, 2024

Related U.S. Application Data

(63) Continuation of application No. 18/240,476, filed on Aug. 31, 2023.

(60) Provisional application No. 63/403,020, filed on Sep. 1, 2022.

(51) Int. Cl.
*B62B 9/10* (2006.01)
*B62B 7/10* (2006.01)
*B62B 9/12* (2006.01)

(52) U.S. Cl.
CPC ............. *B62B 9/102* (2013.01); *B62B 7/10* (2013.01); *B62B 9/12* (2013.01)

(58) Field of Classification Search
CPC .. B60N 2/2848; B60N 2/2845; B60N 2/2842; B60N 2/28; B62B 7/066; B62B 7/083; B62B 7/142; B62B 7/145; B62B 7/08; B62B 7/00; B62B 7/14; B62B 7/10; B62B 9/12; B62B 9/20; B62B 9/12; B62B 9/102

See application file for complete search history.

(56) References Cited

U.S. PATENT DOCUMENTS

| | | | | |
|---|---|---|---|---|
| 4,750,783 | A * | 6/1988 | Irby | B60N 2/2848 297/130 |
| 5,403,022 | A * | 4/1995 | Snider | B62B 7/12 D34/12 |
| 6,523,843 | B2 * | 2/2003 | Wiesemann | B60G 21/0551 267/276 |
| 6,679,506 | B2 * | 1/2004 | Koppes | B62B 9/26 280/47.38 |
| 6,889,998 | B2 * | 5/2005 | Sterns | B62B 3/027 280/DIG. 3 |
| 7,694,980 | B2 * | 4/2010 | Dotsey | B62B 9/102 280/655 |
| 7,694,996 | B2 * | 4/2010 | Saville | B62B 7/062 280/47.38 |
| 8,308,391 | B2 * | 11/2012 | Cheng | B62B 7/08 403/98 |
| 8,469,389 | B2 | 6/2013 | Mazar et al. | |
| 8,544,857 | B2 * | 10/2013 | Schnarr | B62B 3/025 280/30 |
| 8,550,479 | B2 * | 10/2013 | Yi | B62B 9/104 280/47.38 |

(Continued)

*Primary Examiner* — James M Dolak
(74) *Attorney, Agent, or Firm* — Leyendecker & Lemire LLC

(57) ABSTRACT

A stroller having a folding frame which serves as basis for a stroller which can be used in a seat configuration for the transportation of a child, and which can be alternatively used in a cart configuration wherein the seat-bottom and seat-back are hingedly interconnected and configured to fold out into a cart for transporting goods such as groceries.

13 Claims, 32 Drawing Sheets

(56) References Cited

U.S. PATENT DOCUMENTS

| | | | |
|---|---|---|---|
| 8,657,311 B2* | 2/2014 | Li | B62B 7/14 |
| | | | 280/658 |
| 8,696,015 B2* | 4/2014 | Karremans | B62B 7/064 |
| | | | 280/647 |
| 9,039,032 B2* | 5/2015 | Saville | B62B 7/10 |
| | | | 280/650 |
| 9,168,940 B1* | 10/2015 | Leszczak | B60N 2/2848 |
| 9,199,658 B2* | 12/2015 | Chuah | B62B 7/06 |
| 9,221,487 B2* | 12/2015 | Doucette | B62B 7/123 |
| 9,517,785 B2* | 12/2016 | Ponticelli | B62B 5/087 |
| 9,630,642 B2* | 4/2017 | Zehfuss | B62B 9/104 |
| 11,267,376 B2* | 3/2022 | Churilla | B60N 2/2848 |
| 2002/0084628 A1* | 7/2002 | Van Horn | B62B 3/02 |
| | | | 280/47.38 |
| 2006/0082104 A1* | 4/2006 | Wun | B62B 7/062 |
| | | | 280/650 |
| 2012/0119457 A1* | 5/2012 | Williams | B62B 7/083 |
| | | | 280/30 |
| 2019/0135323 A1* | 5/2019 | Avigdor | B62B 7/12 |

* cited by examiner

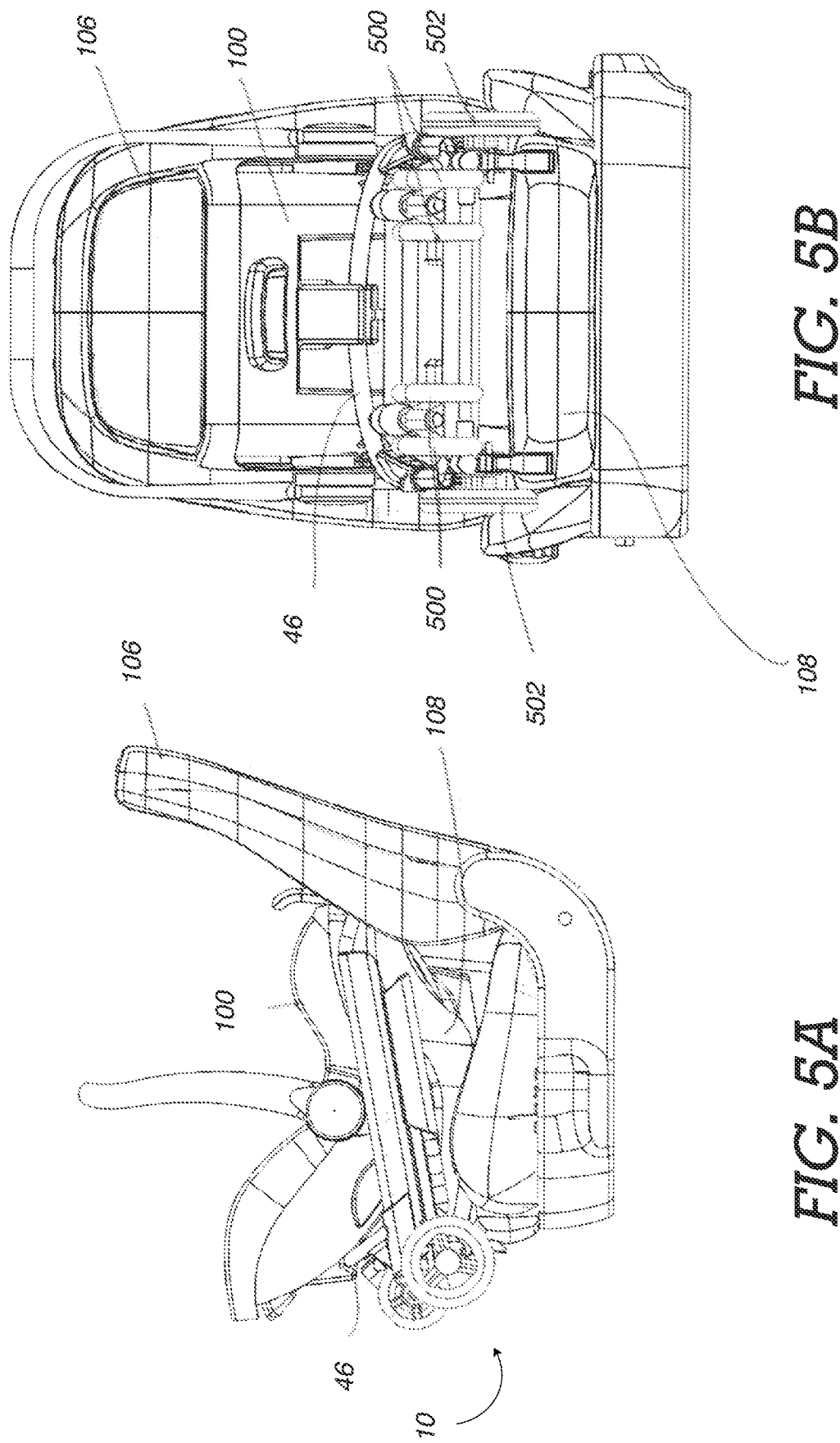

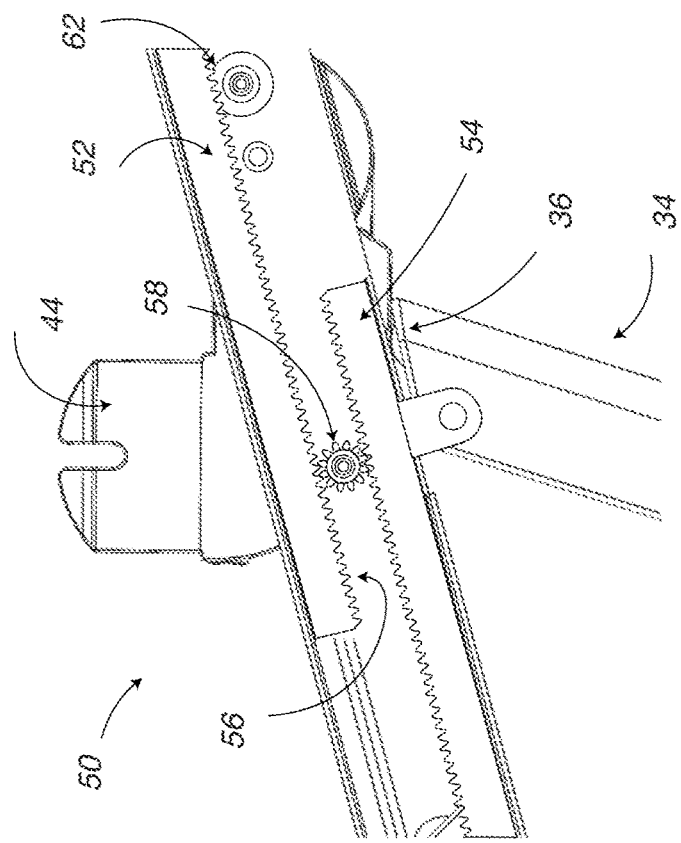
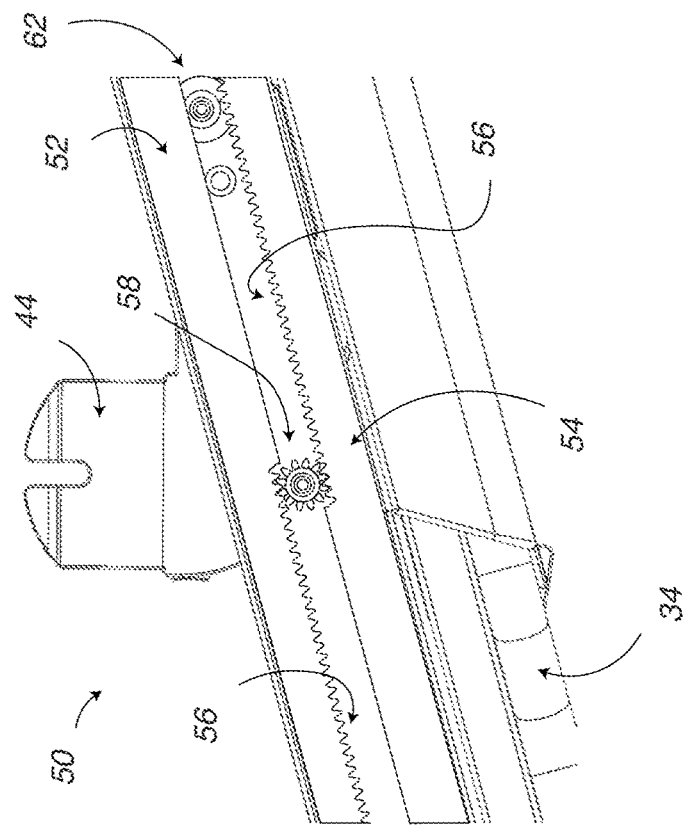
FIG. 7B
FIG. 7A

SECTION C-C

SECTION C-C

SECTION A-A

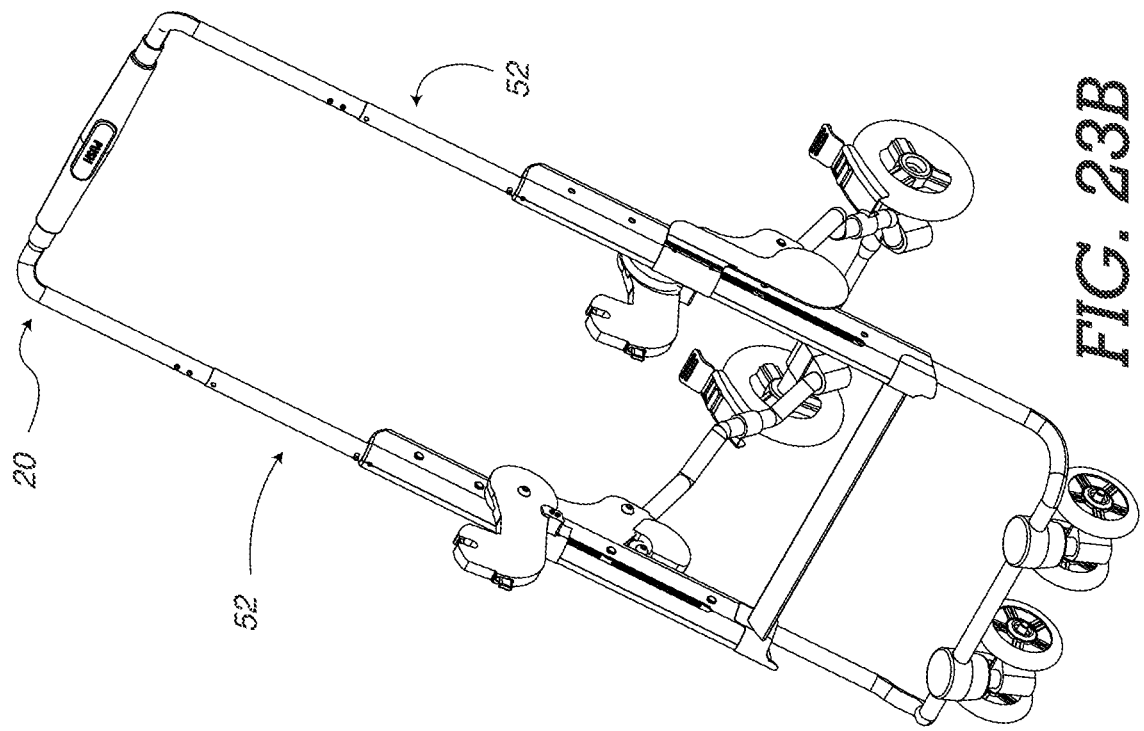
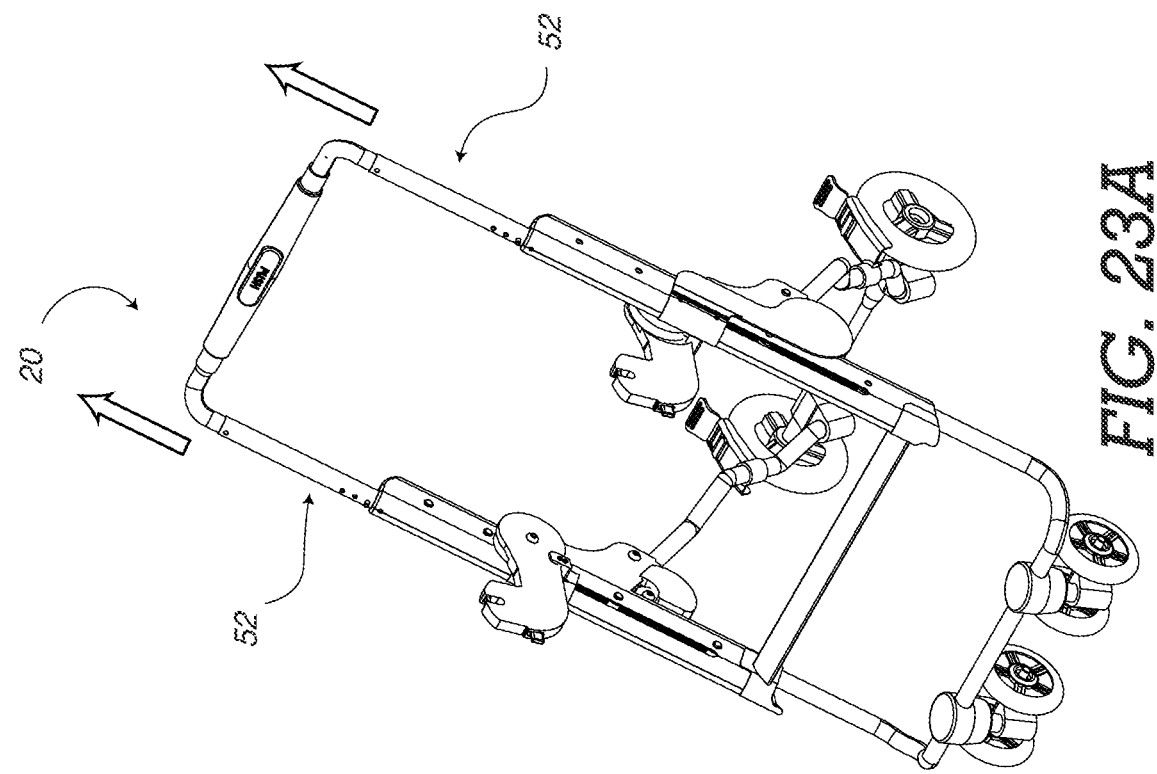

ROLLING FOLDING FRAME WITH SIMULTANEOUSLY DEPLOYABLE HANDLE AND WHEELBASE

CROSS REFERENCE TO RELATED APPLICATIONS

This application claims the benefit of U.S. Provisional Patent Application 63/403,020 entitled "VOLUBLE FOLDING FRAME WITH SIMULTANEOUSLY DEPLOYABLE HANDLE AND WHEELBASE" filed on Sep. 1, 2022; and U.S. Nonprovisional patent application Ser. No. 18/240,476 entitled "ROLLING FOLDING FRAME WITH SIMULTANEOUSLY DEPLOYABLE HANDLE AND WHEELBASE" filed on Aug. 31, 2023, the entire contents of which are incorporated herein by reference in its entirety for all purposes.

FIELD OF THE INVENTION

The present invention relates to a frame configured to roll which is devised to attach to a safety seat, also referred to herein as a child safety seat, for use in connection therewith as a stroller while enabling compact storage of the frame connected to the safety seat when the seat is installed in a vehicle.

The present invention further enables use of the frame as a stroller embodiment for larger children who have outgrown the safety seat, when a basket seat portion is installed in lieu of the safety seat and, further, when the basket seat is moved to a second position, for use as a cart for carrying goods.

BACKGROUND OF THE INVENTION

Various types of strollers and safety seats are seen in the art. Most require a child be removed from the safety seat before being moved to a stroller for transport outside the vehicle, and then transferred from the stroller back to the safety seat interior to the vehicle. This is inconvenient, especially when the child is sleeping. A parent must first retrieve and then deploy the stroller and position the stroller nearby with the wheels locked. Then, the parent must unbuckle and remove the child and then buckle the child into the stroller. The child is, therefore, interrupted and caused to wake when sleeping.

To lessen the disturbance to the infant, modern safety seats releasably engage to a base portion installed to a vehicle seat so that the safety seat may be removed from the vehicle without having to take the child out of the safety seat. Some strollers accommodate interconnection with the safety seat with the stroller, whereby the safety seat may be installed to the stroller for use therewith. However, in these embodiments, the stroller still needs to be fetched from elsewhere in the vehicle or nearby and set up prior to installing the safety seat thereto. Even embodiments with quick release and interconnection features nonetheless require this two-step process to access the stroller and set it up prior to fitting the safety seat, released from the base portion in the vehicle, to the stroller.

In 2015, Doona® introduced the first car seat stroller combination, such as disclosed in U.S. Pat. No. 8,469,389 to Mazar, et al. ("Mazar"), which is incorporated herein by reference in its entirety for all purposes. Parents could simply detach the safety seat from engagement with the vehicle restraints and deploy a stroller frame that was storable compactly around the seat. The child was able to remain in the safety seat and the stroller was deployable from the seat when removed from the vehicle. However, the Doona® stroller is integrated with a particular safety seat, cannot be used with existing safety seats, is not separable from the frame, and is not adaptable for use after a child has outgrown the safety seat. In other words, once the infant has outgrown the safety seat, the child has outgrown the stroller as well.

What is needed is a rolling folding frame with simultaneously deployable handle and wheelbase that engages to an existing safety seat, folds to store compactly around the safety seat when installed interior to a vehicle, deploys readily for use as a stroller, and further, serves as a frame which is adaptable for use with children who have outgrown the safety seat as well as enable alternative use as a cart.

SUMMARY OF THE INVENTION

It is an aspect of the present invention to provide a portable rolling foldable frame, also referred to as a "folding frame", and "frame" herein, in multiple functional purposes to provide a versatile apparatus which is useful beyond its functional use as a stroller. The present rolling folding frame with simultaneously deployable handle and wheelbase has been devised to enable use of a foldable frame in conjunction with a child safety seat. In certain embodiments, the foldable frame is interconnected to the child safety seat, and the foldable frame is in a folded configuration wherein the assembly of the child safety seat and the folding frame are configured to be securely installable within to a vehicle with the foldable frame attached; Furthermore, in a deployed configuration the assembly of the child safety seat and the foldable frame is configured for use as a stroller. In certain embodiments, the foldable frame comprises an integral seat wherein the foldable frame can be used as a stroller for larger children, such as a toddler. In certain embodiments, the foldable frame is configured for use as a cart for transporting items such as groceries. In certain embodiments the integral seat comprises a stroller configuration for receiving and transporting a child in a first position, and wherein the seat can further be unfolded and/or deployed as a cart for use in a cart configuration in a second position.

The present rolling folding frame with simultaneously deployable handle and wheelbase, therefore, presents a number of useful and interchangeable embodiments, first to stow folded upon a seat in a vehicle when used in conjunction with a safety seat for an infant or baby, thereby enabling easy retrieval from the vehicle for deployment as a stroller; for use with larger children as a stroller when the basket seat portion is added in lieu of the safety seat; and finally, as a cart when the basket seat portion is moved to a second position for the transport of goods. As such, the instant rolling folding frame with simultaneously deployable handle and wheelbase enables varied and continued use as a child ages.

Certain embodiments of the present frame has, therefore, been devised to attach to an existing safety seat and enable compact folding into a folded position sized to fit upon the seat of a vehicle with the safety seat engaged in the vehicle to a base portion, in the proper manner as seen in the art, without the frame obtrusively occupying or excluding space within the vehicle interior. The safety seat may subsequently be removed from engagement with the vehicle, in the normal manner, by disconnecting the seat from its base portion as seen in the art, and the frame thence moved to an unfolded position wherein the wheelbase and handle are conveniently deployed for use as a stroller, without removing the child from the safety seat or having to retrieve the stroller from elsewhere in the vehicle and set it up for receipt of the safety seat as currently common in the art.

A user may, therefore, remove the frame with safety seat attached from the vehicle and easily deploy the wheelbase and handle for use of the frame as a stroller without the child having to change position and without the user having to fetch a stroller from elsewhere in the vehicle. Thus, an infant may be transported to and from a vehicle without having to disturb the infant or wake the infant when sleeping. This not only saves time in releasing and resecuring the infant between locations; retrieving, deploying and situating a stroller for receipt of the child; it is also less disruptive for the infant and, therefore, for the parent or family. Furthermore, such embodiments preserve limited storage space within the vehicle as a stroller is no longer required to be transported within the vehicle.

Further, the safety seat is detachable from the frame and a basket seat portion is installable to convert the frame for use with larger children, such as toddlers, who have outgrown safety seats. In a first position, the basket seat serves as a seat wherein the rolling foldable frame serves as a stroller for toddlers to carry and transport a child using the rolling foldable frame. When the basket seat is moved to a second position, the basket seat portion serves as a storage volume for a cart embodiment whereby the same frame may be deployed for multiple uses as a child ages and for the transport of goods and supplies, as the case may be. In other words, a user may use the present rolling frame with simultaneously deployable handle and wheelbase for life—once a safety seat is no longer required, the frame is still usable as a stroller; and once the stroller is no longer needed, the frame is usable as a cart for transporting groceries and the like. Furthermore, the ease of transition between configurations is rapid and without the use of tools, wherein a user may use the foldable frame in conjunction with an infant car seat, transport a toddler seated in the basket seat in a first position, and transport groceries and the like in the basket seat in a second position through the course of the same day. Compactable storage of the frame maintains utility for transport, deployment, use, and storage, even when not connected to a safety seat.

The frame, therefore, has been devised to compactly stow around a safety seat with which the frame is connected. The frame is configured to be moveable between a folded position and an unfolded position. Movement to the folded position compactly stows the wheelbase and handle into a retracted configuration fittable upon a rear seat in a vehicle without impeding the securement of the safety seat to the base portion or, in some safety seat models, the vehicle seat, nor obstructing access to the release means by which the safety seat is detached from the vehicle seat or base portion. Once the safety seat is detached from engagement inside the vehicle—typically by depression of a quick release button— movement of the frame to the unfolded position is conveniently effectuated to extend the wheelbase and handle into an extended and deployed configuration in a single action.

At least one rack and pinion mechanism is disposed on the frame that drives the handle portion and the wheelbase between the retracted and extended configurations, wherein the handle and the wheelbase are interconnected. Each the handle and the wheelbase comprise a rack which is intermeshed with a shared pinion gear, 180-degrees opposed from each other. Thus, the extension of the handle results in the extension of the wheelbase, and the retraction of the handle results in the retraction of the wheelbase. The rack and pinion mechanism is disposed in conjunction with a tubular or elongate central support. This central support is medially located between the handle and wheelbase to enable opposing extension of the handle and wheelbase by sliding engagement of a upper rack member and a lower rack member disposed on either side of the central support. When the frame is moved to the folded position, the upper rack of the rack and pinon mechanism aligns atop or around the central support, superimposing upon the central support on one side of the central support. Similarly, when the frame is moved to the folded position, the lower rack likewise aligns underneath the central support, superimposing under the central support synchronously matched to movement of the upper rack. As referenced herein, the upper rack members are associated with the handle portion which may comprise a singular upper rack member 52, or a plurality thereof. Similarly, lower rack members are associated with the wheelbase which may comprise a singular lower rack member 54, or a plurality thereof. However, embodiments wherein the upper rack member aligns underneath the central support and intermeshing with the pinion, and wherein the lower rack member aligns atop the central support intermeshing with the pinion are within the spirit and scope of the present invention. Furthermore, while embodiments discussed and shown herein comprise a rack-and-pinion interconnection between the handle and the shared pinion gear, and a rack-and-pinion interconnection between the wheelbase and the shared pinion gear, embodiments which provide similar action without the discrete use of a traditional rack-and-pinion are within the spirit and scope of the present invention. Specifically, mechanisms which interconnect the handle and the wheelbase in a manner such that when handle is extended outward, the wheelbase extends outward; and when the wheelbase is retracted inward, the wheelbase retracts inward, are within the spirit and scope of the present invention. Such mechanisms within the spirit and scope of the present invention include tethered pulley systems, electrically powered systems with electrically actuated motors, pneumatically powered motors, block and tackle interconnections, dual rack with shared pinion systems wherein a motor drives the pinion gear, a manually driven pinion gear, rack and pinion systems wherein the pinion comprises a worm gear to prevent unintentional configuration changes.

In certain embodiments, each of the upper rack member and lower rack members includes a toothed edge disposed to matingly engage with at least one pinon whereby linear motion of either track member translates via rotational engagement of the at least one pinon to linear motion in the opposite direction of the other track member. Thus, extending the handle upwards when deploying the frame for use, for example, slides the upper rack member upward along a first direction in a generally diagonal plane relative to the ground surface. Simultaneously, the lower rack member is moved downward along the same plane of movement but in the opposite direction. As such, when the handle is pulled to deployment, the wheelbase is extended. And when the wheelbase is pushed downward for deployment, so the handle is extended.

In certain embodiments, the wheelbase includes a front set of wheels and a rear set of wheels. Rear set of wheels are disposed endwise upon a rear wheel frame member, which is pivotally connected to the lower rack member. As front set of wheels deploy to the extended position when the frame is moved to the unfolded position, the rear wheel frame swings downward and pivots outward to set a wheelbase wherein rear set of wheels are spaced apart from front set of wheels and the frame's center of gravity is disposed underneath the frame center between the front and rear sets of wheels.

Front wheels are disposed upon a front wheel frame member that is operatively coupled to the lower rack member. Front wheel frame member is, therefore, disposed to slidingly deploy downward to the extended position when the lower rack member is caused to move within the same plane of motion of, but in the opposite direction to, a handle frame portion, which is in turn operatively coupled to the first frame member.

The handle is disposed upon the handle frame portion that is connected to the upper rack member. When the frame is moved to the unfolded position, therefore, the handle frame portion extends upward along the same diagonal plane of motion as front wheel frame member but in the opposite direction. The handle may further include rear handle portion disposed to pivotally unfold outward to increase handle length and position a user pushing the frame rearwardly back from the frame's center of gravity to enable better control and to tip the front set wheels upwards during use when desired (such as when mounting a curb, for example). Rear handle portion further extends the range of the handle while maintaining compactability of the frame when moved to the folded position.

In certain embodiments, the handle frame portion and front and rear wheel frames may be selectively lockable in the extended configurations. In such embodiments, release means enable movement of the frame to and from the folded position, and therefore the handle and wheelbase to the retracted and extended configurations. Release means may include, for example, depressible buttons and/or detents disposed to release the frame proximal the handle or upon the handle, or upon the frame in key positions enabling selective release of the frame at specific locations to properly effectuate movement to the folded position. In at least one embodiment contemplated herein, a release button on the handle enables release of all securement mechanisms when depressed. Thus, when the release button is depressed, the frame is easily returned to the folded position and the safety seat is re-installable to its base upon a vehicle seat without having to remove the frame from the safety seat.

It should be understood from the above, and with reference to the drawings disclosed herein, that the rack and pinon mechanism described may be duplicated and/or disposed on either side of the frame to deploy the handle and wheelbase simultaneously. Further, additional articulated elements of the frame are contemplated as included within the general scope of this disclosure and, in certain embodiments disclosed herein, at least one strut member may be disposed between front and rear wheel frames in association with the rack and pinion mechanism. In such embodiments, the strut member is pivotally connected at each end to the front and rear wheel frames, whereby movement of the upper rack member and lower rack member causes the strut member to pivot as the upper rack or lower rack travels whereby the strut's other end rotates to position the strut member horizontally between the front wheel frame and rear wheel frame members in parallel relationship with a ground surface upon which the stroller is piloted. As mentioned above, rear wheel frame member may be pivotally attached at an anterior end to the lower rack member, whereby the anterior end of rear wheel frame travels with the lower rack member as the wheelbase is deployed. Such an arrangement enables the frame to more compactly store as the rear wheel frame travels along the central support into the extended configuration when the frame is unfolded. Conversely, the rear wheel frame member travels upwards with the lower rack member as the frame is moved to the folded position whereby the rear wheel frame member seats in parallel with the central support and the upper rack member and lower rack members. Additional embodiments enabling complementary articulation of the wheelbase and rear wheel frame member are contemplated as within scope of this disclosure as, for example, where the anterior end of the rear wheel frame is fixed, and one end of the strut member travels in conjunction with the lower rack member.

When present, the strut member is contemplated to structurally support the wheelbase in the extended configuration and may prevent unintended folding of the frame. It should be noted that additional means of stabilizing the wheelbase in the extended position are contemplated as within scope of this disclosure, including a mechanism disposed to selectively lock the anterior end of the rear wheel frame member when the wheelbase is deployed to the extended configuration whereby the strut member is not required. In certain embodiments, a first portion clamping element interconnected to the upper rack member is configured to translate longitudinally to a posterior portion of the front wheel frame and an anterior portion of the rear wheel frame. Preferably, the lower clamping element translates to the pivotal interconnection between the front wheel frame and the rear wheel frame, wherein the lower clamping element is configured to prevent the folding of the wheels when the wheels are deployed. A upper clamping element is further located on a posterior aspect of the rear wheel frame wherein the upper clamping element is typically a static structure, but not limited thereto. The upper clamping element is configured to prevent the over-rotation of the rear wheel frame beyond a predetermined angle in relation to the front wheel frame wherein a portion of the rear wheel frame is clamped between the lower clamping element and the upper clamping element when the foldable frame is extended to an unfolded and deployed configuration. Another example embodiment contemplates use of a bracket, flange, or projection from the anterior end that prevents over extension of the rear wheel frame and provides stability by spreading tension forced upon the anterior end through the bracket, flange, or projection. In some embodiments contemplated as within scope of this disclosure, for example, the rear wheel frame member may move to the folded position against the tension of a torsion spring, sprung between the central support, front wheel frame, lower rack member, or housing, and the rear wheel frame member. Additional means of articulating the frame are contemplated as within scope of this disclosure where the frame is facilitated in moving to or from the folded position and also secured in the folded and unfolded positions.

The frame may be attachable to existing models of safety seats by interconnection of bracket members with the seat. Safety seats often include connection means disposed at termini underlying the seat handle which spans the seat for use with separable strollers. Existing safety seats further include means to securely connect to the base portion installed in the vehicle. Release of the seat from the base portion is typically effectuated by a single button disposed to release interconnection of the seat from the base portion. In the present invention, the frame member connects around the safety seat without compromising the quick release features of the seat in securing to the base portion. Some models of seat include a clasp member disposed rearwardly upon the seat-back which is disposed to interconnect with anterior portions of existing strollers. The present invention presents a front frame portion transversely disposed between the front wheels, against which the safety seat clasp may engage when the frame is moved to the folded position and the seat is attached to the base. Quick release of the seat to disengage the seat from the base also disengages the clasp from the front frame portion of the instant frame whereby the safety seat may be easily removed from the car with the frame attached and without the frame impeding such passage of the seat from the vehicle interior.

In the present invention, the frame member may connect with the safety seat by bracket members oriented to interconnect with the seat by attachment means disposed proximal termini of the seat's handle. The frame's bracket members may rotatably orient relative to the frame to secure between a first position and a second position. Thus, when moved to the folded position, the bracket members may rotate relative to the frame to accommodate compact storage of the frame to the vehicle seat. Likewise, when moved to the unfolded position, as the wheelbase and handle portion are deployed, the bracket members may rotate to the second position to orient the safety seat transversely relative to the frame and horizontally aligned with a ground surface upon which the frame is used.

As noted herein below, the bracket members may further rotate to a third position, oriented rearwardly of the frame portion for interconnection with an adapter member when the frame is converted for use with children who have outgrown the safety seat.

The adapter member is included to convert the frame for use with a basket seat portion in lieu of the safety seat. The adapter member is devised to connect with the frame's bracket members. The bracket members are rotatable to and releasably securable in the third position oriented rearwardly of the frame. Adapter member includes end pieces which are disposed to secure into interconnection portions of the bracket members. The adapter member is therefore positioned transversely between handle frame portions underneath and parallel with the handle. The basket seat portion is thence attachable to the adapter member along an upper edge of the basket seat portion and to front frame member, disposed between front wheel frame portions.

The basket seat portion may be installed in a second configuration, or a second shaped basket portion may be installed, whereby the basket seat portion is usable as a volume to transport goods when the frame is employed for use as a cart. In an example embodiment herein disclosed, the basked seat portion includes a back, a seat, and a base. The seat may be configured to unfold from the base. When in the first position, then, the seat is disposed on top of the base. When moved to the second position, the seat is lifted and unfolded forwardly whereby the base is exposed between the seat and the back of the basket seat portion and the seat is disposed upright or angularly relative the base defining a storage volume between the seat and the back. Flexible membrane or membrane-like sidewalls likewise deploy from under the seat with the seat is lifted and unfolded to the second position. The result is a volume within the seat which may be used for transporting items.

The present rolling folding frame with simultaneously deployable handle and wheelbase is, therefore, adaptable for various uses as a child ages. It conveniently stows in connection with a safety seat into a vehicle without a user having to detach the safety seat from the frame first. The same safety seat is usable in a vehicle secured to a seat in the vehicle with the frame attached whereby a user may readily lift the safety seat from the vehicle and rapidly deploy the frame to the unfolded position with wheelbase and handle extended. When the child has grown sufficiently that a safety seat is no longer required, the frame may be adapted for use with a basket seat portion installed in lieu of the safety seat. Finally, when the stroller is no longer needed for a child, the basket seat portion may be unfolded for use as a porting volume wherein groceries and items may be transported.

Thus, has been broadly outlined the more important features of the present rolling folding frame with simultaneously deployable handle and wheelbase so that the detailed description thereof that follows may be better understood and in order that the present contribution to the art may be better appreciated.

For better understanding of the rolling folding frame with simultaneously deployable handle and wheelbase, its operating advantages and specific objects attained by its uses, refer to the accompanying drawings and description.

These and other advantages will be apparent from the disclosure of the inventions contained herein. The above-described embodiments, objectives, and configurations are neither complete nor exhaustive. As will be appreciated, other embodiments of the invention are possible using, alone or in combination, one or more of the features set forth above or described in detail below. Further, this Summary is neither intended nor should it be construed as being representative of the full extent and scope of the present invention. The present invention is set forth in various levels of detail in this Summary, as well as in the attached drawings and the detailed description below, and no limitation as to the scope of the present invention is intended to either the inclusion or non-inclusion of elements, components, etc. in this Summary. Additional aspects of the present invention will become more readily apparent from the detailed description, particularly when taken together with the drawings, and the claims provided herein.

DETAILED DESCRIPTION OF VARIOUS EMBODIMENTS

It should be noted that the present embodiments set forth in the accompanying drawings are intended only for the purposes of illustration to exemplify the general concepts comprising the invention herein described, and are not, therefore, intended as limiting. The features shown and discussed herein should be taken to include variations wherein the overall concept such features embody may, within the reading of a person of ordinary skill in this art, be applied in different forms and structures wherever not contrary to the general intent or motivation implied by this disclosure.

The term "safety seat," as used herein throughout, is contemplated to include existing safety seats devised for use interior to a vehicle. This term is distinguished herein by a "vehicle seat" which is generally applied herein to the seat(s) existing in a vehicle to which the safety seat is installable. The term "safety seat" is intended broadly and without limitation to mean any seat that is installable and removable from a vehicle for safely transporting people, and, in most embodiments, children and infants.

Figure 1:
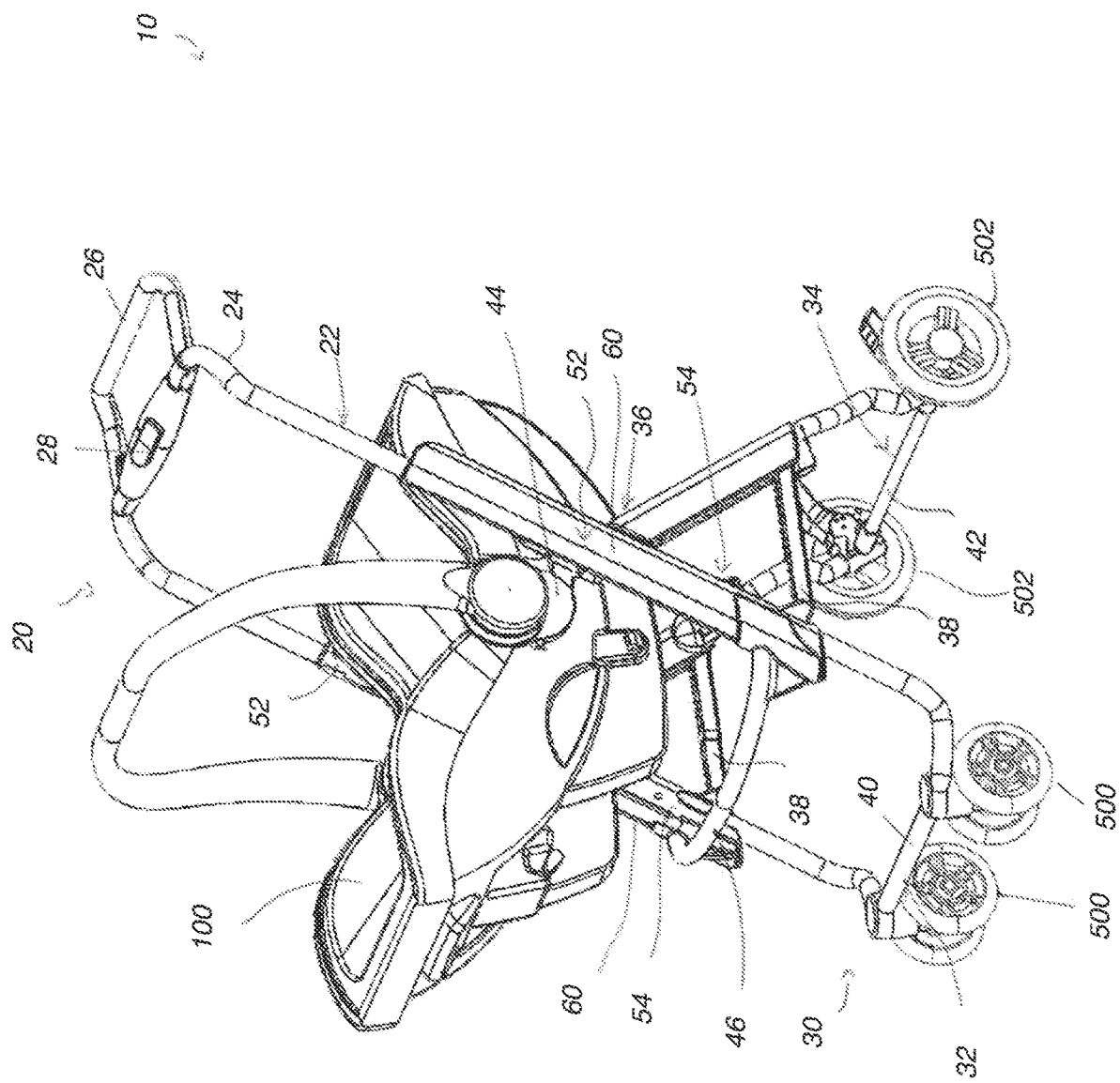
FIG. 1—A perspective view of an example embodiment in an unfolded position interconnected with a child safety seat FIG. 2—A side view of the example embodiment shown in FIG. 1

With this distinction in mind, then, FIG. 1 illustrates certain example embodiments of the instant foldable frame 10 in an unfolded position with a safety seat 100 attached. In such embodiments, foldable frame 10 includes handle portion 20 and wheelbase 30 in extended configuration. Handle portion 20 includes handle frame 22, handle 24, and rear handle portion 26. Handle frame 22 is operatively coupled upon at least one side with upper rack member 52 (see, e.g., FIG. 7A-FIG. 7D), disposed interior to housing 60.

Wheelbase 30 includes front wheel frame member 32 and rear wheel frame member 34. Front wheel frame member 32 is operatively coupled with lower rack member 54 (see, e.g., FIG. 7A to FIG. 7B), disposed interior to housing 60. In such example embodiments, rear wheel frame member 34 is hingedly or pivotally coupled to lower rack member 54 disposed interior to housing 60 and includes anterior end 36. The example embodiment as shown further includes strut member 38 pivotally connected endwise between front wheel frame 32 and rear wheel frame 34. Strut member 38 deploys to a horizontal position from a position parallel with front wheel frame member 32 when folding frame 10 is moved to the unfolded position. Front frame member 46 is disposed spanned between lower extremities of housing 60. Embodiments comprising rear wheel frame member 34 interconnected to the front wheel frame 32 with alternate methods which allow the folding, or otherwise permit the stowage of the rear wheel frame 34 are within the spirit and scope of the present invention. Furthermore, embodiments wherein the rear wheels 502 are each interconnected to a first and second rear wheel frames 34, wherein the rear wheel frames are independent of each other which are configured to stow when the frame 10 is in a folded configuration, are within the spirit and scope of the present invention.

Front wheels 500 are disposed along a first wheel track 40 that spans a lesser length than rear wheels 502 disposed upon a second wheel track 42. As shown for example in FIG. 4, the difference in length of wheel tracks 40, 42 enables nesting of front wheels 500 in between rear wheels 502 when the frame 10 is moved to the folded position.

In certain embodiments, a safety seat 100 is securely mounted to frame 10 by bracket members 44 disposed to slidingly mate into attachment portions 102 disposed upon the safety seat 100 in the manner seen in the art by which safety seat 100 mounts to other existing strollers. In at least one example embodiment contemplated herein, safety seat 100 may also engage connection clasp 104 against front frame member 46 when frame 10 is moved to the folded position (see, e.g., FIG. 3A-FIG. 3B).

Figure 2:
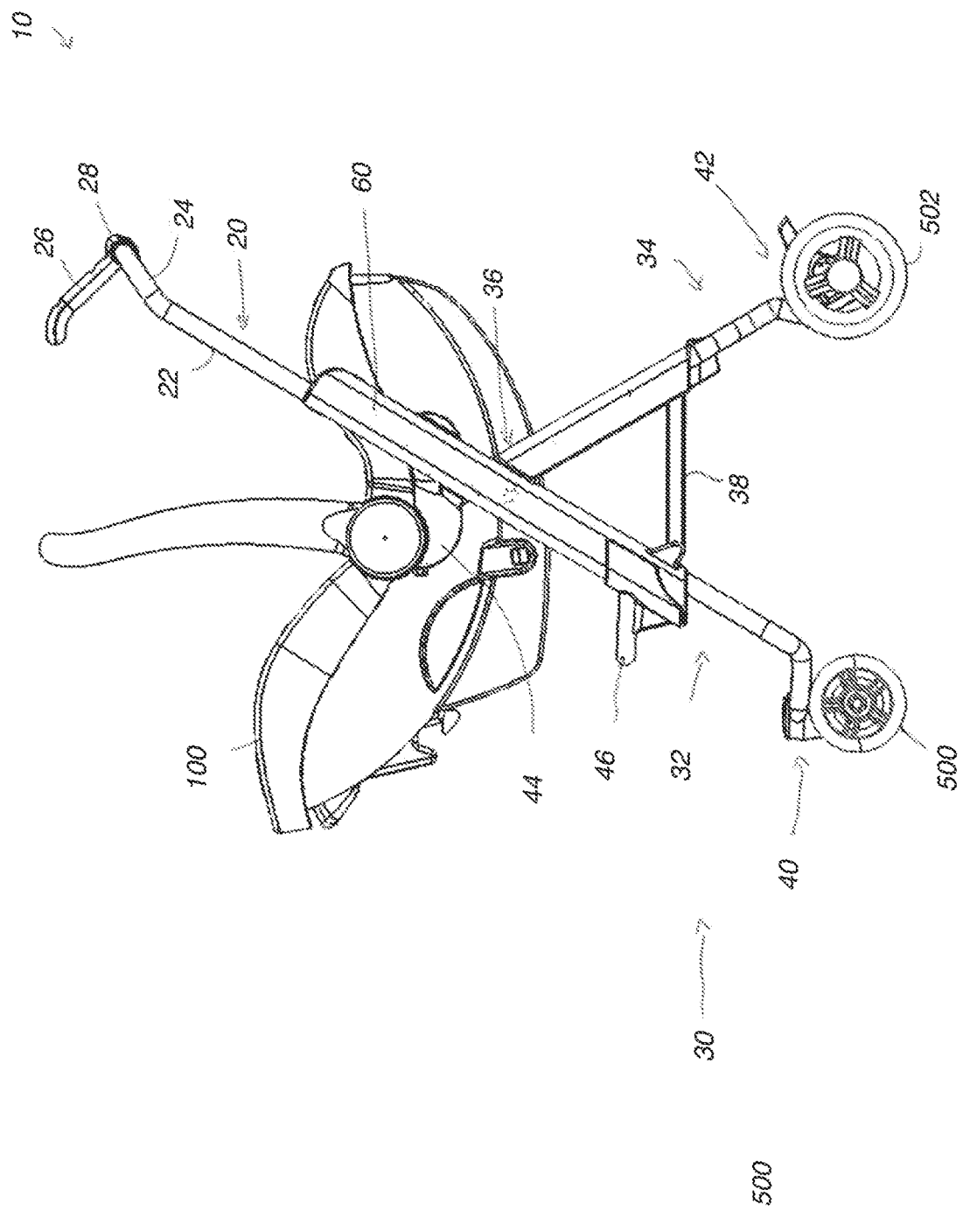
Figure 3:
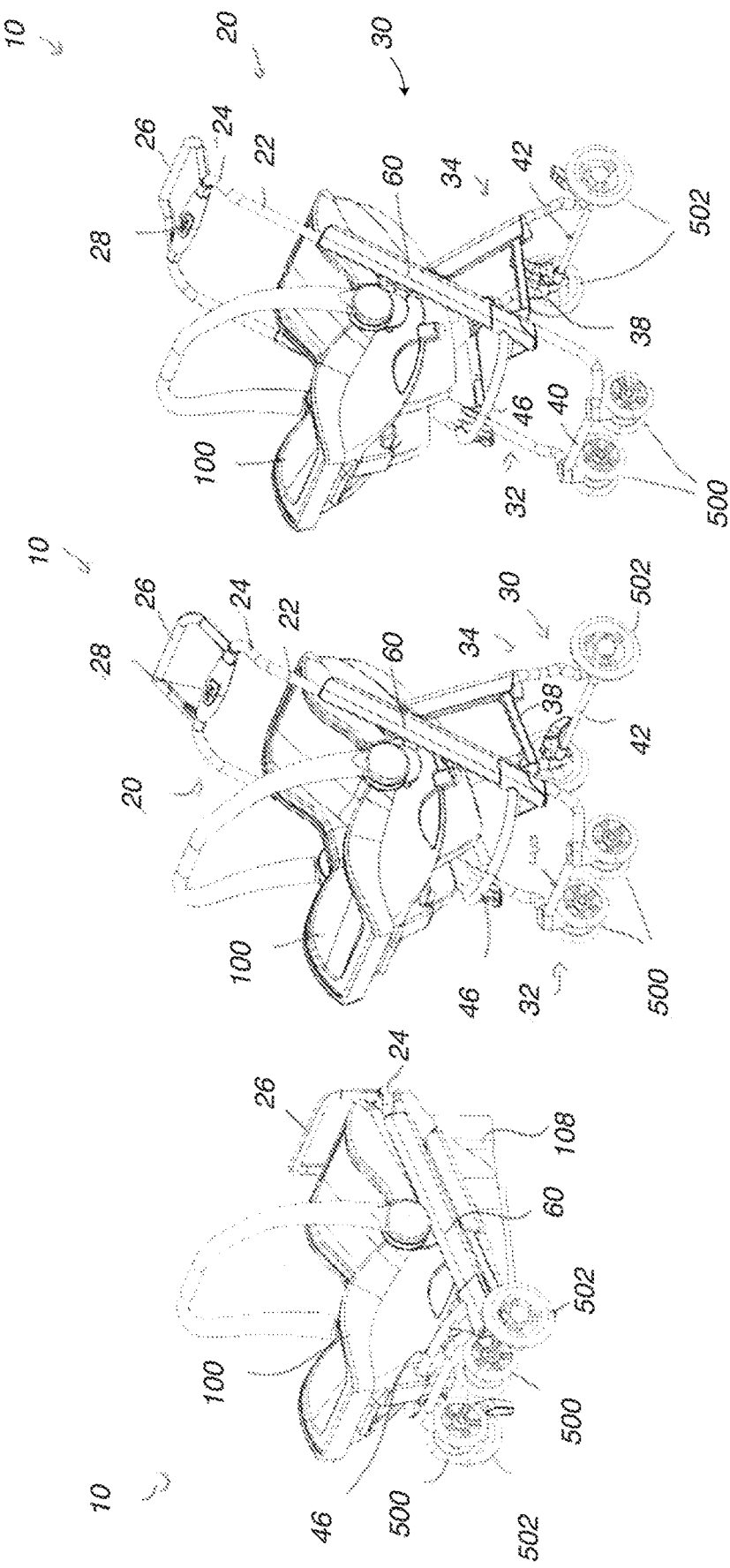
FIG. 3A—A perspective view depicting an example embodiment with a safety seat interconnected thereto wherein the frame is in a folded position FIG. 3B—A perspective view depicting an example embodiment with a safety seat interconnected thereto wherein the frame is in an intermediate position between a folded position and an unfolded position FIG. 3C—A perspective view depicting an example embodiment with a safety seat interconnected thereto wherein the frame is in an unfolded position FIG. 4—A side view of an example embodiment in a folded position detached from a base portion FIG. 5A—A side view of an example embodiment in a folded position interconnected to a vehicle seat FIG. 5B—A front view of the example embodiment shown in FIG. 5A

In certain embodiments, as shown for instance in FIG. 2. which illustrates a side elevation view of the example embodiment depicted in FIG. 1, a rear handle portion 26 is disposed in a forward position. Handle portion 20 and wheelbase 30 are in the extended configuration for use of the frame 10 as a stroller. The handle position as shown in FIG. 2-FIG. 3C, can be modified and adapted for use as a stroller for users of varying heights, and folded into a stowed position for placement within a vehicle.

In certain embodiments, as shown for example in FIG. 3A-FIG. 3C, the movement of the frame 10 from a folded position to the unfolded position, whereby the handle portion 20 and wheelbase 30 are deployed, illustrates the adjustment of the handle portion 20 from a stowed position (FIG. 3A) to an unfolded or deployed position as shown in FIG. 3B-FIG. 3C. Foldable frame 10 is shown in the folded position with the safety seat 100 attached.

Figure 4:
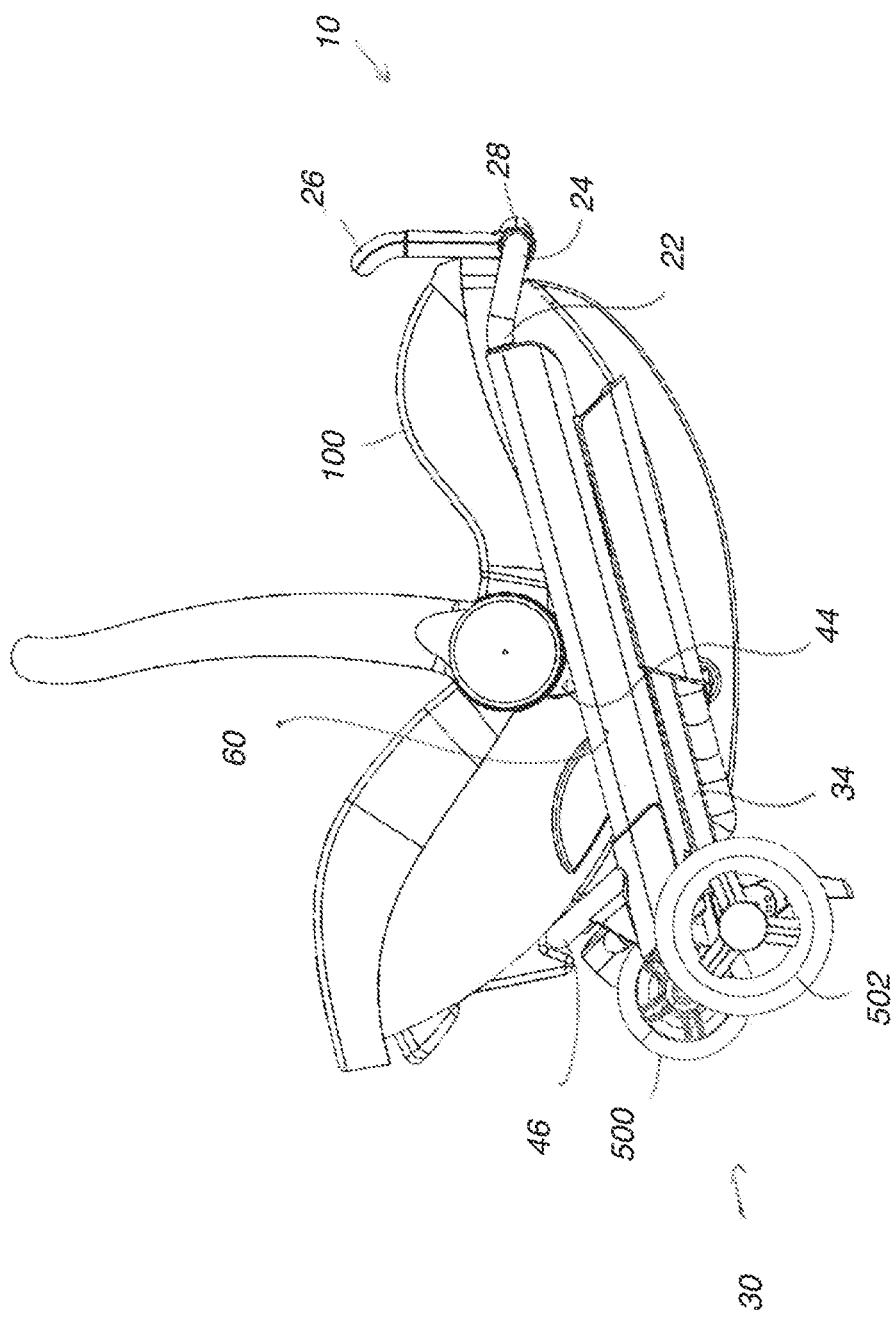

In certain embodiments bracket members 44 securely maintain safety seat 100 in contact with frame 10. Bracket members 44 may be rotational and secure between a first position (FIG. 6A and FIG. 7A-FIG. 7B), a second position (FIG. 6B-FIG. 6C), and, when adapted for use with a basket seat portion 70 (see, e.g., FIG. 10A-FIG. 10B), in a third position. In the first position, the bracket members 44 are configured to be substantially aligned with the housings 60, and wherein the bracket members 44 are configured to be angularly opposed to the housings or substantially aligned with a ground plane 9000 in the second position. When the frame 10 is deployed from the folded position to the unfolded position, bracket members 44 may rotate between the first position (FIG. 6A) to the second position (FIG. 6B-FIG. 6C) to secure the seat 100 in a transverse plane relative the frame's 10 upright situation (FIG. 6A-FIG. 6C), versus a more parallel position, as shown in FIG. 4, which is relative to housing 60 when stowed in the folded position. In this manner, bracket members 44 enable compact storage of the frame upon a vehicle seat 100 (see, e.g., FIG. 4).

When moved to the unfolded position, wheelbase 30 is deployed by action of the front wheel frame member 32 extending downwards from housing 60 as lower rack member 54 is caused to extend. By action of at least one rack and pinon mechanism 50 disposed interior to housing 60 (see, e.g., FIG. 7A-FIG. 7B, and FIG. 24A-FIG. 24C), downward motion of the front wheel frame member 32 simultaneously effectuates upward motion of handle frame 22 in the opposite direction. Causing wheelbase 30 to deploy, therefore, simultaneously deploys the handle 24. Similarly, pulling the handle frame 22 upwards, therefore, simultaneously deploys wheelbase 30 into the extended configuration. When moved to the unfolded position, frame 10 locks into the unfolded position with handle portion 20 and wheelbase 30 extended. Supporting member 49 is caused to slide upward with motion of rack and pinon mechanism 50 to engage against safety seat 100, or against the bracket member 44 to which the safety seat 100 is interconnected, thereby configuring the frame 10 for use as a stroller for an infant. In certain embodiments supporting member slides upward toward the bracket member 44 when converting from a folded configuration (FIG. 6A) to an unfolded configuration (FIG. 6C) wherein the supporting member 49 contacts the lower portion of the supporting bracket 44 and rotatively reconfigures the supporting bracket 44 from a first configuration (FIG. 6A) to a second configuration (FIG. 6C).

FIG. 4 illustrates an example embodiment of frame 10 attached to the safety seat 100 in the folded position. The angular relationship of safety seat 100 to frame 10 is shown whereby rotation of bracket members 44 accommodates reorientation of the seat 100 relative to frame 10 for use when frame 10 is moved to the unfolded position. Front and rear wheels 500, 502 stow together with front wheels 500 nested in between rear wheels 502. Safety seat 100 contacts front frame member 46 and, in this embodiment, connection clasp 104 engages to front frame member 46. Frame 10 can therefore be ported connected to seat 100 in the folded position without moving under gravity to the unfolded position when connection clasp 104 is engaged against front frame member 46. Rear wheel frame member 34 stows up against and in parallel with housing 60. Front wheel frame member 32 retracts interior to housing 60 and seats in parallel underlying handle frame 22, which is also retracted interior to housing 60. Rear handle portion 26 is forwardly disposed and may present release means 28 for quick release of frame 10 between the folded and unfolded positions. Release means 28 may include additional or other release means devised to operationally communicate with means of securing the frame 10 in the folded and unfolded positions.

FIG. 5A-FIG. 5B illustrates an example embodiment of the frame 10 with safety seat 100 attached and installed to vehicle seat 106. Frame 10 has been devised to compactly stow upon the vehicle seat 106 without obtruding into surrounding space. Safety seat 100 is secured to vehicle seat by interconnection with base portion 108 (see, e.g., FIG. 8A) which readily engages to safety seat 100 in manners generally seen in the art. Safety seat 100 is readily releasable from base portion 108 when a release means disposed upon seat 100 is depressed or disengaged by a user. See, e.g., FIG. 8B. As such, seat 100 with frame 10 attached is removable from base portion 108 when the seat's 100 quick release is depressed. Frame 10 may deploy under the influence of gravity to the unfolded position when front frame member 46 is released from connection clasp 104, and frame 10 may be maintained in the folded position upon seat 100 when connection clasp 104 engages front frame member 46. Alternatively, the safety seat 100 is configured to interconnect to the vehicle seat 106 through the use of a safety belt present within the vehicle which is associated with the vehicle seat 106.

Figure 6C:
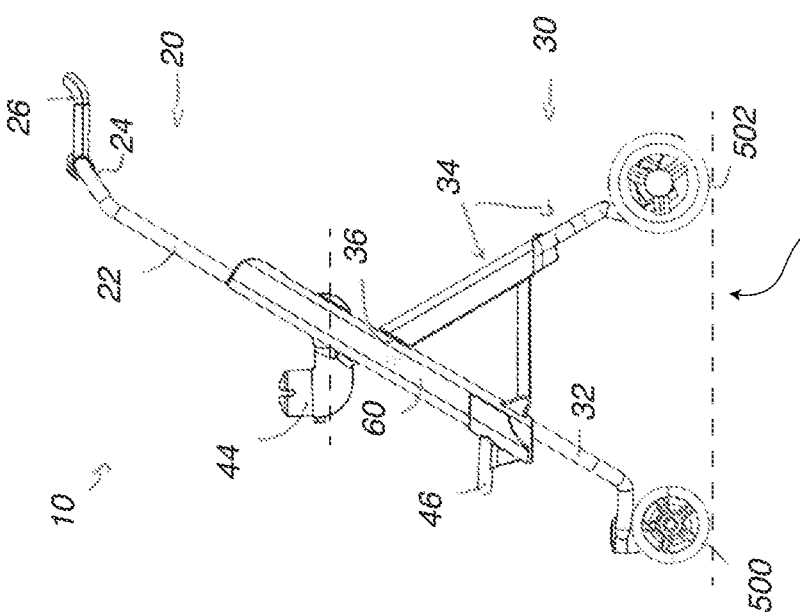
FIG. 6A—A side view depicting an example embodiment without a safety seat attached in a folded position FIG. 6B—A side view depicting an example embodiment without a safety seat attached in an intermediate position between a folded position and an unfolded position FIG. 6C—A side view depicting an example embodiment without a safety seat attached in an unfolded position FIG. 7A—A detail side view of an example embodiment of a rack and pinion mechanism by which a handle frame portion and a wheelbase are simultaneously deployed from a folded position to unfolded position, shown in a folded position FIG. 7B—A detail side view of an example embodiment of a rack and pinion mechanism by which a handle frame portion and a wheelbase are simultaneously deployed from a folded position to an unfolded position, shown in an unfolded position FIG. 7C—A detail side view of the rack and pinion mechanism shown in FIG. 7A FIG. 7D—A detail side view of the rack and pinion mechanism shown in FIG. 7B FIG. 8A—A side view of an example embodiment of the frame in the folded position interconnected to a safety seat with the safety seat releasably interconnected to a base portion as typically installed interior to a vehicle and to which base portion the safety seat readily releases when a quick release on the seat is depressed to disengage the seat from the base portion FIG. 8B—A side view of the example embodiment shown in FIG. 8A with the seat disengaged from its base portion FIG. 9A—A detail perspective view of an example embodiment of a bracket member release means by which the safety seat is detachable from the frame FIG. 9B—A perspective view of the frame in the unfolded position showing detachment of the safety seat from the bracket members FIG. 10A—A perspective view of an example embodiment of an end of an adapter member devised for interconnection with bracket members disposed upon the foldable frame by which the frame is convertible for use with a basket seat portion FIG. 10B—An perspective view of an example embodiment of the adapter member installed to the frame FIG. 11A—A front perspective view of an example embodiment an unfolded frame with a basket seat interconnected thereto for use as a stroller with children who have outgrown the safety seat FIG. 11B—A detail perspective view of the basket seat portion of FIG. 11A FIG. 12A—A front perspective view of an example embodiment of a basket seat portion disposed in a second position with a front wall portion unfolded forward whereby sidewalls deploy for use as a cart FIG. 12B—A perspective view of the example embodiment shown in FIG. 12A FIG. 12C—A side view of the example embodiment shown in FIG. 12A FIG. 13A—A detail view of the rear handle portion in a stowed position in certain embodiments FIG. 13B—A detail view of the rear handle portion in an intermediate position in certain embodiments FIG. 13C—A detail view of the rear handle portion in a stowed position in certain embodiments FIG. 14A—A perspective view of certain embodiments of the folding frame in a folded or stowed configuration FIG. 14B—A front view of certain embodiments of the folding frame in a folded or stowed configuration FIG. 14C—A side view of certain embodiments of the folding frame in a folded or stowed configuration FIG. 15A—A perspective view of certain embodiments of the folding frame in an unfolded or deployed configuration FIG. 15B—A front view of certain embodiments of the folding frame in an unfolded or deployed configuration FIG. 15C—A side view of certain embodiments of the folding frame in an unfolded or deployed configuration FIG. 16A—A perspective view of certain embodiments of the folding frame in an unfolded or deployed configuration with the clamping elements in a partially open configuration to demonstrate functionality FIG. 16B—A front view of certain embodiments of the folding frame in an unfolded or deployed configuration with the clamping elements in a partially open configuration to demonstrate functionality FIG. 16C—A side view of certain embodiments of the folding frame in an unfolded or deployed configuration with the clamping elements in a partially open configuration to demonstrate functionality FIG. 16D—An alternate section view of the embodiment of a folding frame in a folded configuration shown in FIG. 14B wherein the upper clamping element is transparent FIG. 16E—An alternate section view of the embodiment of a folding frame in an unfolded configuration shown in FIG. 15B wherein the upper clamping element is transparent FIG. 17A—A perspective view of a safety seat interconnected with an embodiment of a folding frame, wherein the folding frame is in a folded or stowed configuration FIG. 17B—A perspective view of a safety seat interconnected with an embodiment of a folding frame, wherein the folding frame is in an intermediate configuration between a folded configuration and unfolded configuration FIG. 17C—A perspective view of a safety seat interconnected with an embodiment of a folding frame, wherein the folding frame is in an unfolded or deployed configuration FIG. 18A—A perspective view of certain embodiments of the folding frame in a folded or stowed configuration FIG. 18B—A perspective view of certain embodiments of the folding frame in an intermediate configuration between a folded configuration and an unfolded stowed configuration FIG. 18C—A perspective view of certain embodiments of the folding frame in an unfolded or deployed configuration FIG. 19A—A side view of a safety seat with a stowed folding frame interconnected thereto, prior to interconnection with a safety seat base FIG. 19B—A side view of a safety seat with a stowed folding frame interconnected thereto, interconnected with a safety seat base FIG. 20—A side view of a safety seat with a stowed folding frame interconnected thereto, and interconnected to a safety seat base, and the forementioned assembly interconnected to a vehicle seat FIG. 21A—A perspective view of an embodiments of a folding frame in an unfolded configuration with a seat-cart module interconnected thereto, wherein the seat-cart module is in a seat configuration FIG. 21B—A perspective view of an embodiments of a folding frame in an unfolded configuration with a seat-cart module interconnected thereto, wherein the seat-cart module is in a cart configuration FIG. 21C—A side view of an embodiments of a folding frame in an unfolded configuration with a seat-cart module interconnected thereto, wherein the seat-cart module is in a cart configuration FIG. 21D—A side view of an embodiments of a folding frame in an unfolded configuration with a seat-cart module interconnected thereto, wherein the seat-cart module is in an intermediate position between a seat configuration and a cart configuration FIG. 22A—A perspective view of an embodiments of a folding frame in an unfolded configuration with a seat-cart module interconnected thereto, wherein the seat-cart module is in a cart configuration, and wherein the cart comprises a posterior side fitted with a flexible material FIG. 22B—A perspective view of an embodiments of a folding frame in an unfolded configuration with a seat-cart module interconnected thereto, wherein the seat-cart module is in a cart configuration, and wherein the cart comprises a posterior side fitted with a rigid or semi-rigid panel FIG. 23A—A perspective view of certain embodiments of a folding frame in an unfolded configuration, wherein the handle portion is configured to telescopically extend from the upper rack members FIG. 23B—A perspective view of certain embodiments of a folding frame in an unfolded configuration, wherein the handle portion is telescopically extended from the upper rack members FIG. 24A—A side semi-transparent view of an example embodiment of a rack and pinion mechanism by which a handle frame portion and a wheelbase are simultaneously deployed from a folded position to unfolded position, shown in a folded position, wherein the folding frame is interconnected to a safety seat FIG. 24B—A side semi-transparent view of an example embodiment of a rack and pinion mechanism by which a handle frame portion and a wheelbase are simultaneously deployed from a folded position to unfolded position, shown in an intermediate position between a folded position and an unfolded position, wherein the folding frame is interconnected to a safety seat FIG. 24C—A side semi-transparent view of an example embodiment of a rack and pinion mechanism by which a handle frame portion and a wheelbase are simultaneously deployed from a folded position to unfolded position, shown in an unfolded position, wherein the folding frame is interconnected to a safety seat
Figure 6B:
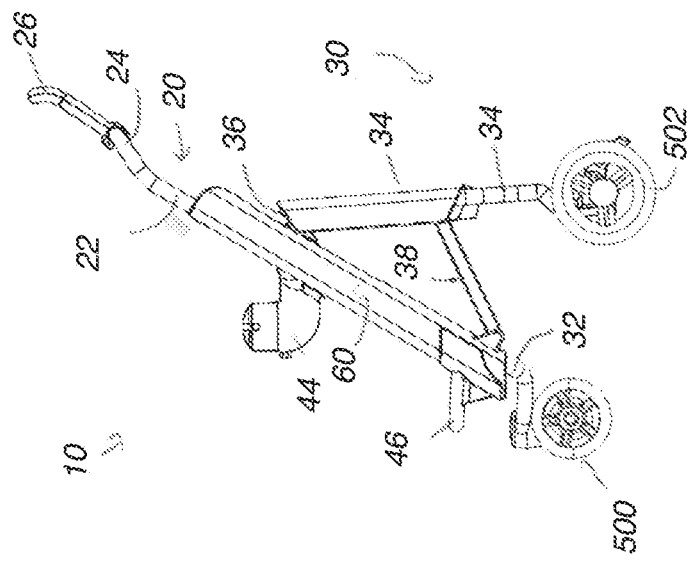
Figure 6A:
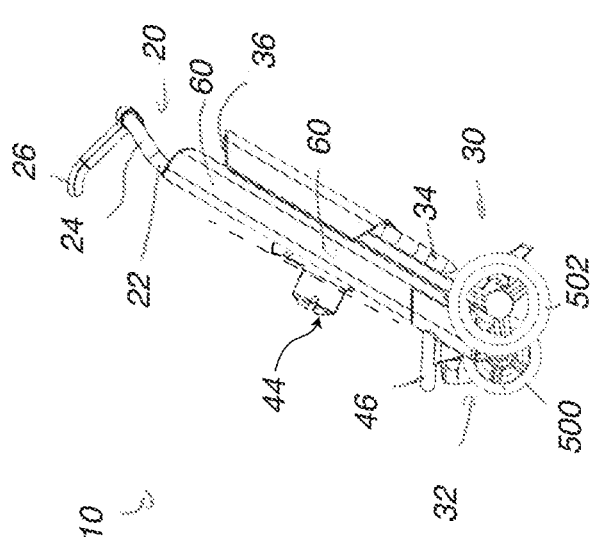
Figure 7D:
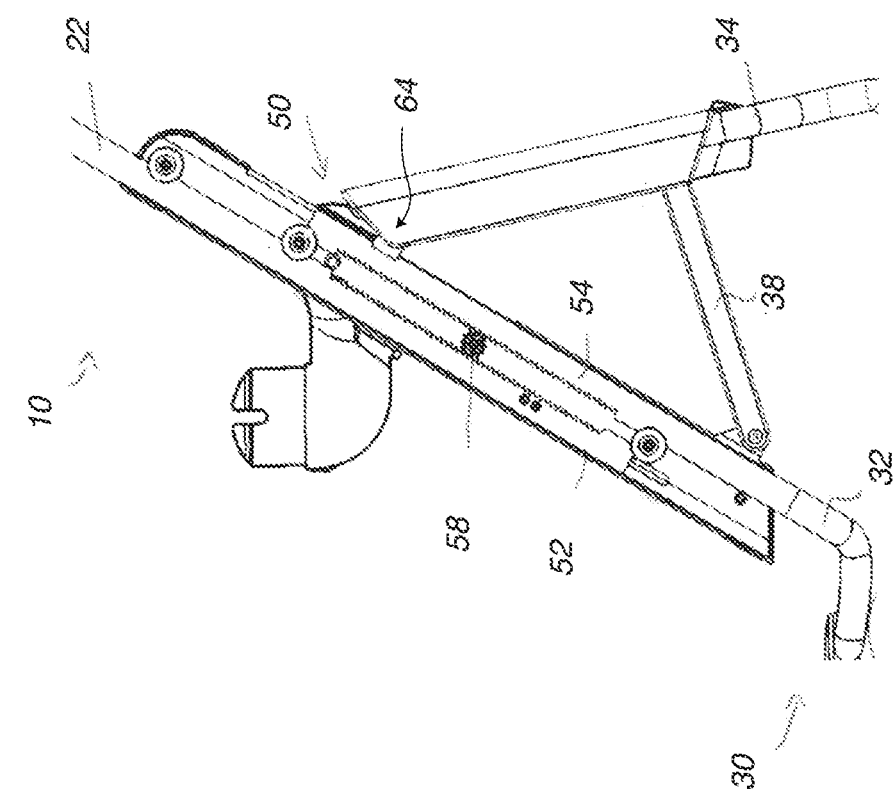
Figure 7C:
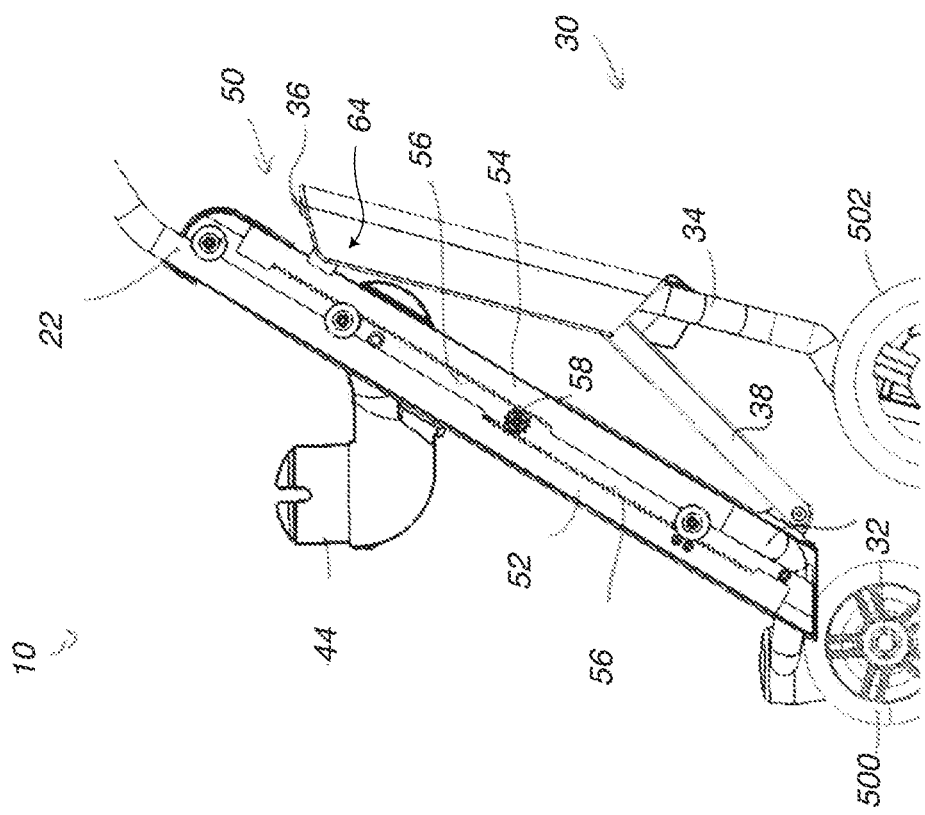

FIG. 6A-FIG. 6C illustrates an example embodiment of frame 10 extending from the folded position to the unfolded position without the safety seat 100 attached. As rear wheel frame member 34 is swung outward from parallel alignment with housing 60, front wheel frame member 32 and handle frame 22 are deployed simultaneously to the extended configuration. In this example embodiment shown, strut member 38 pivotally deploys to secure in horizontal situation between front and rear wheel frame members 32, 34. Anterior end 36 of rear wheel frame member 34 is pivotally attached to lower rack member 54. Anterior end 36 slidingly travels with lower rack member 54 as lower rack member 54 is deployed toward the extended configuration. In some example embodiments contemplated here, strut member 38 is omitted, and rear wheel frame member 34 may be secured in the extended configuration at anterior end 36 by stop means. In some embodiments, stop means may include supporting member 49 (FIG. 10B), which moves into position to supportively engage safety seat 100 and position flange or bracket or other means to secure rear wheel frame member 34 in the extended configuration. Embodiments omitting strut member 38 may be more compact and enable shorter frame sections whereby wheelbase 30 in the extended configuration may be set wider apart without compromising overall compactibility of frame 10, a principal motivation of the present apparatus. Stop means (not shown) are contemplated to include detents, torsion springs, flanges, projections, and other means of preventing overextension of wheelbase 30 and unintended movement to the folded position, and may be incorporated with or in addition to or in lieu of supporting member 49.

FIG. 7A-FIG. 7B is an example embodiment of a detail view of a rack and pinon mechanism 50 disposed interior to housing 60. Upper rack member 52 is operatively coupled to handle frame 22 and lower rack member 54 is operatively coupled to front wheel frame member 32. Each upper rack member 52 and lower rack member 54 includes toothed edge 56 devised to engage with pinion 58. When one rack member is moved in one direction, rotational movement of pinon 58 translates said directional movement to move the other rack member in the other direction. Upper rack members 52 and lower rack members 54 may have an arched cross section, such as a cylinder with an open face, whereby each rack member 52, 54 travels atop a cylindrical central support 62 and toothed edges 56 are disposed overlapping and in parallel with said cylindrical support 62. While rack members 52, 54 shown herein comprise a linear longitudinal form, embodiments wherein at least one rack member 52, 54 comprises a curvilinear form are within the spirit and scope of the present invention.

As shown in FIG. 7A-FIG. 7D for instance, when frame 10 is in the folded position, upper rack member 52 and lower rack members 54 stow interior to housing 60 in parallel relation. When frame 10 is moved to the unfolded position, upper rack members 52 and lower rack members 54 deploy to farthest extension as controlled and maintained by housing 60, cylindrical support 62, or an extremity or termini of each toothed edge 56, or other stop member, detent, or means of preventing overextension thereof.

Anterior end 36 of rear wheel frame member 34 is pivotally connected to lower rack member 54 at pivot point 64, wherein anterior end 36 is caused to travel and rear wheel frame member 34 is caused to move to the extended configuration when lower rack member 54 slides the front wheel frame member 32 to the extended configuration. Alternative embodiments of this mechanism are contemplated as within scope of this disclosure, including for example an embodiment wherein the rear wheel frame member 34 is pivotally connected to housing 60 or central support 62 and wherein strut member 38 is pivotally connected at one end and slidingly engages its other end between a stowed position and an extended position when wheelbase 30 is deployed.

FIG. 7A-FIG. 7D depict detail views of the rack and pinion mechanism 50 at various stages of deploying wheelbase 30. Housing 60 is not shown in FIG. 7B-FIG. 7C so that upper rack member and lower rack members 53, 54 may be seen in relative position. As is shown, in this example embodiment, anterior end 36 of rear wheel frame member 34 travels with lower rack member 54 from a position in parallel with the lower rack member 54 to a position acutely disposed relative thereto when wheelbase 30 is deployed to the extended configuration.

It should be noted that a rack and pinion mechanism 50 may be likewise disposed on the other side of frame 10, or upon both sides whereby at least two rack and pinon mechanisms operate to securely deploy and retract the handle portion 20 and wheelbase 30.

Figure 8B:
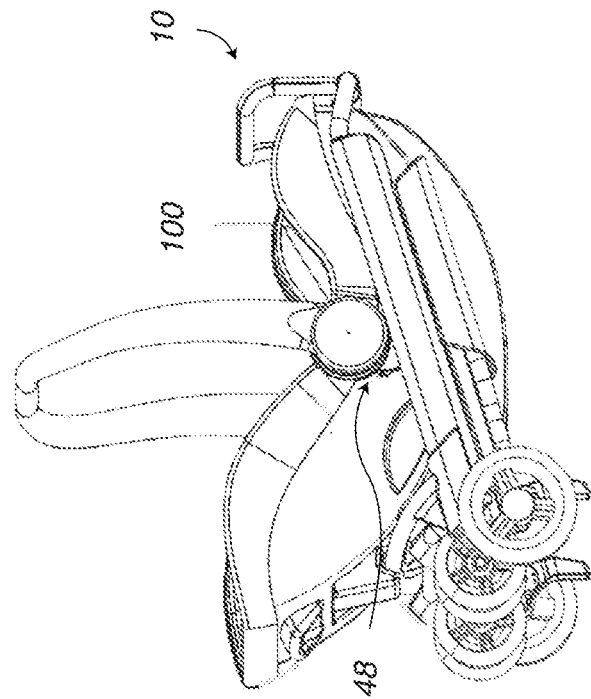
Figure 8A:
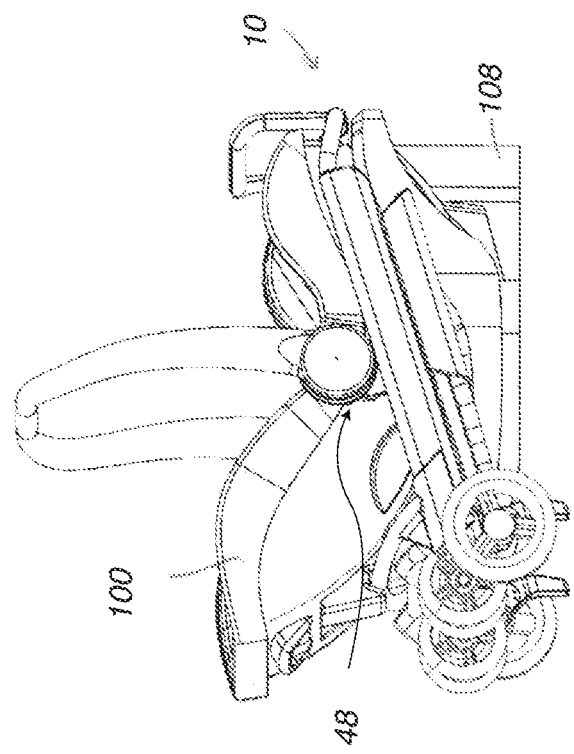

FIG. 8A illustrates a side elevation view of an example embodiment of frame 10 in the folded position connected to a safety seat 100. Safety seat 100 may engage against front frame member 46 at rear connection clasp 104. Quick release of safety seat 100 from base portion 108 is contemplated to effectuate release of front frame member 46 as shown in FIG. 8B.

Figure 9B:
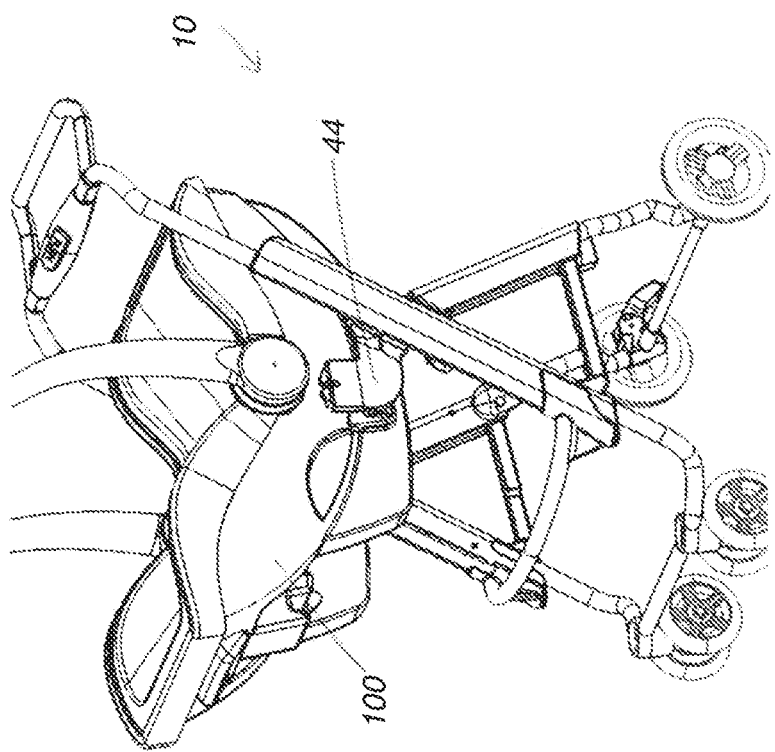
Figure 9A:
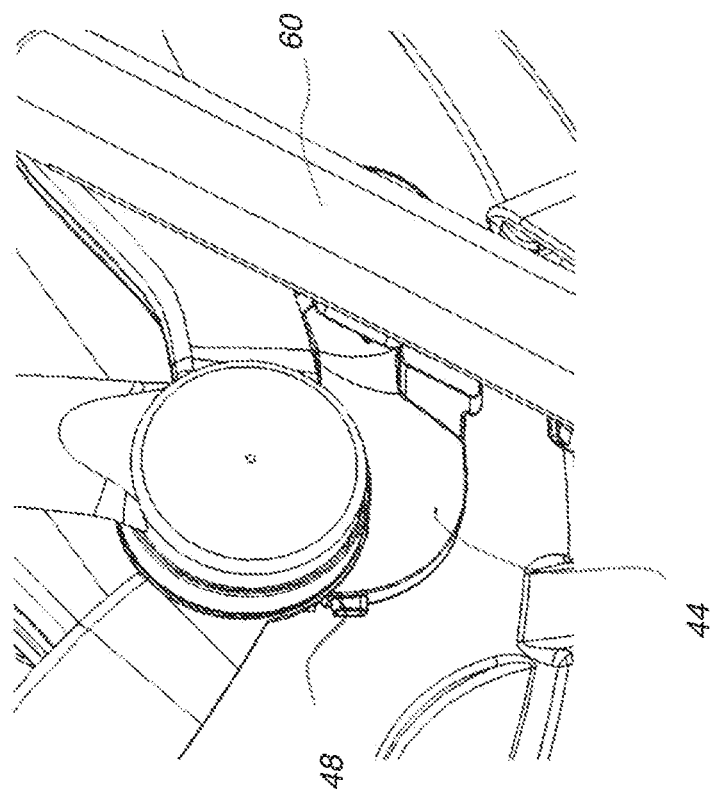
Figure 10B:
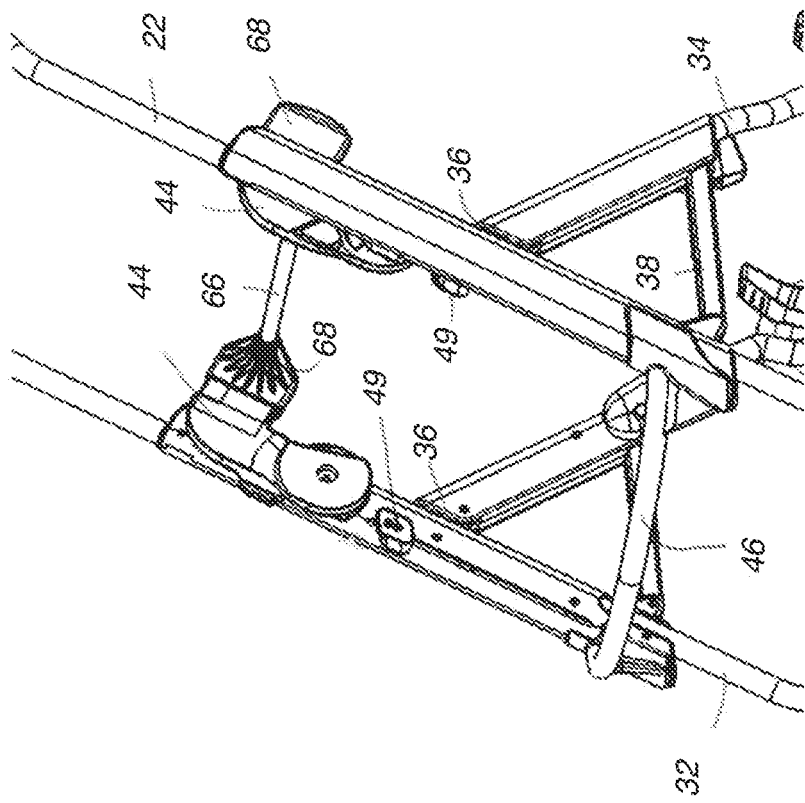
Figure 10A:
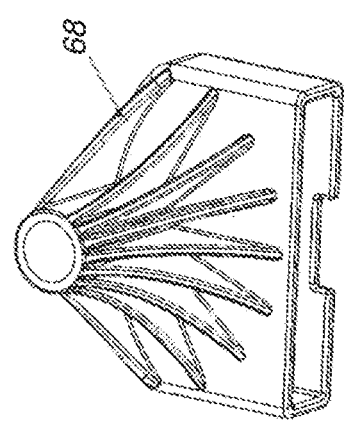

FIG. 9A illustrates a detail view of an example embodiment of a release means 48 disposed upon bracket member 44 whereby depression of said release means 48 effectuates release of the bracket member 44 from engagement interior to attachment portions 102 of safety seat 100. As shown in FIG. 9B, when release means 48 are depressed, safety seat 100 may be removed from engagement with bracket members 44 and frame 10 disengaged from safety seat 100. Release means 48 may operate to directly communicate with structure of each bracket member 44 or otherwise operatively communicate with structure interior to attachment portions 102 of safety seat 100 to effectuate release of the mechanism interior to attachment portion 102 of safety seat 100. FIG. 10A is a detail elevation view of an example embodiment of an adapter member end 68 which is configured to interconnect with adapter member 66, wherein the adaptor member ends 68 are devised to interconnect with bracket members 44 in lieu of the safety seat 100 when frame 10 is converted for use with basket seat portion 70 (see, e.g., FIG. 11). As shown in FIG. 10B, adapter member 66 secures to bracket members 44 when bracket members 44 are rotated approximately 90° to situate and secure rearwardly projected for interconnection with ends 68 of adapter member 66 whereby adapter member 66 is securable horizontally between housings 60 and handle frames 22.

Figure 11B:
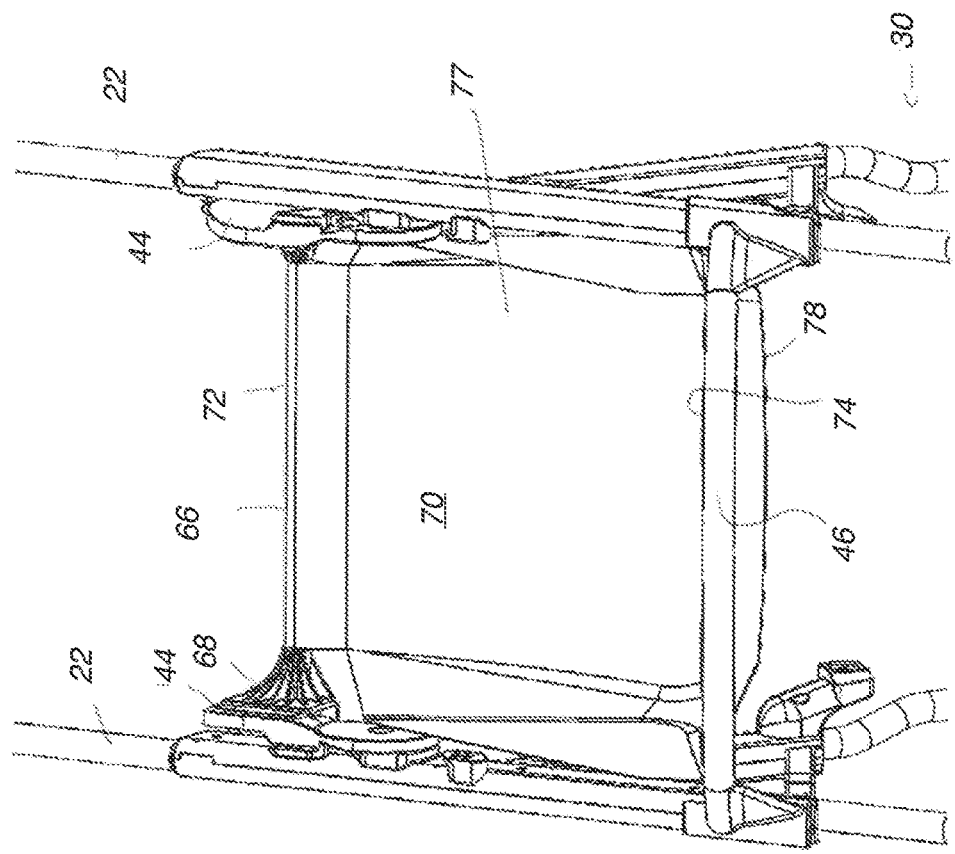
Figure 11A:
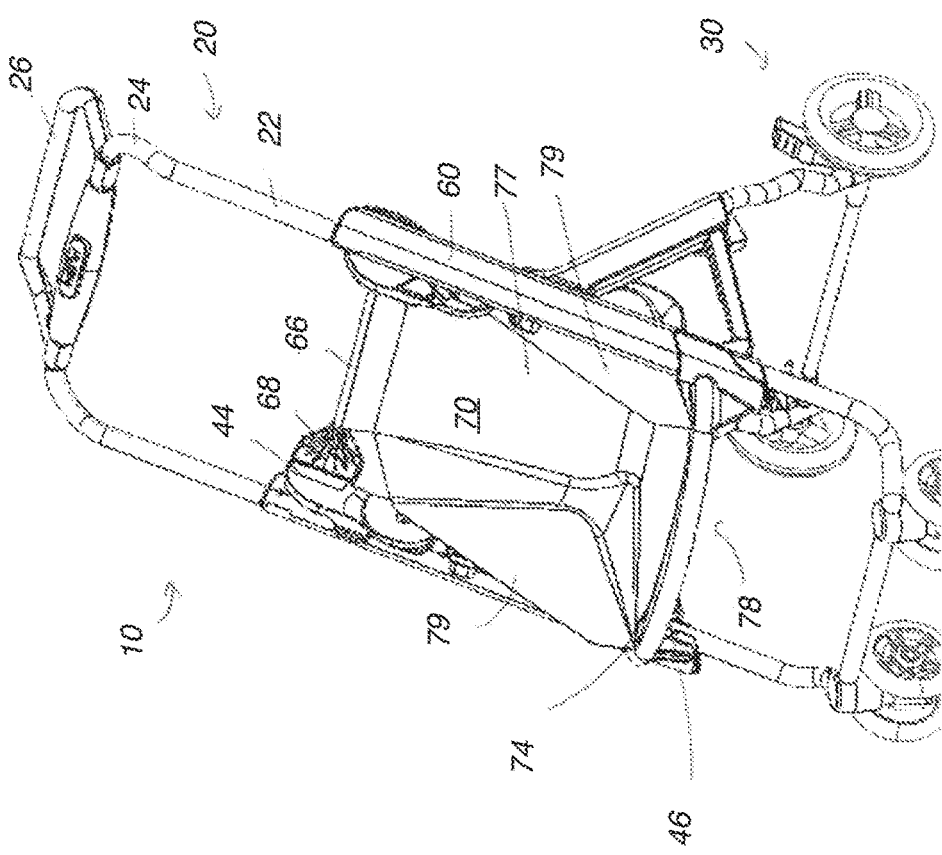

FIG. 11A depicts an example embodiment of the basket seat portion 70 attached to the adapter member 66 and front frame member 46 of frame 10. Basket seat portion 70 includes first edge 72 which may be attachable to adapter member 66. Basket seat portion 70 includes second edge 74 which may be attachable to front frame member 46. Basket seat portion 70 may be manufactured from fabric whereby the basket seat portion 70 is suspended from adapter member 66 and front frame member 46. FIG. 11B illustrates a detail view of the basket seat portion 70. First edge 72 is engaged around adapter member 66. Second edge 74 is engaged around the front frame member 46. Additional and other means are contemplated as engaging the basket seat portion 70 to frame 10. Basket seat portion 70 is contemplated to be made of fabric or netting or other material that is compactable for storage when not in use and is yet comfortable in support of a child using the basket seat portion 70 as a seat.

Additional and other materials and combinations of materials are contemplated as within scope of this disclosure, including lightweight plastics, polymers, and other such materials suited for the purpose. In the example embodiment depicted, basket seat portion 70 may include planar portions 76 which are more rigid yet include soft surfaces for sitting on. First edge 72 and second edge 74 may include elasticated sections or portions or members to provide additional comfort in use.

Figures 12A, 12B, 12C:
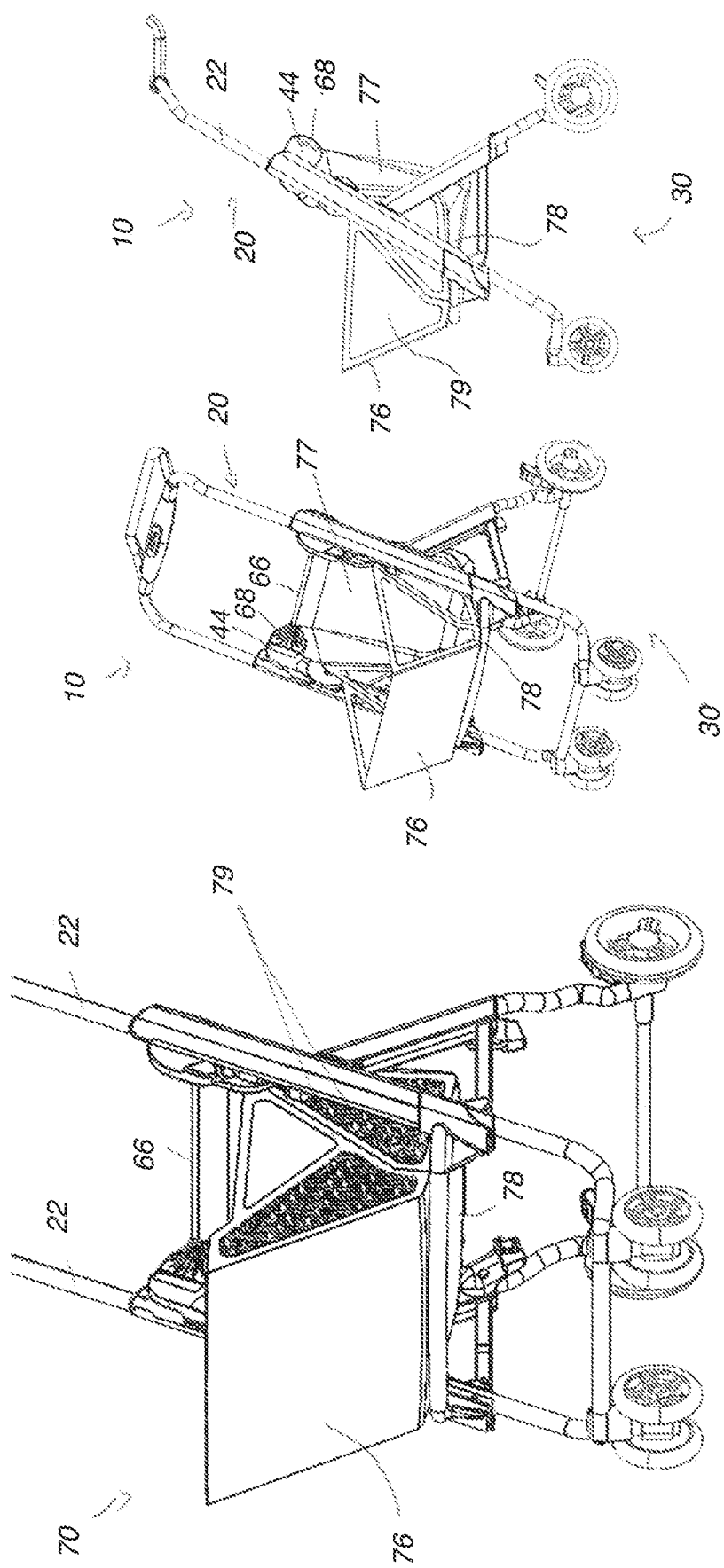

As shown in FIG. 12A-FIG. 12C, basket seat portion 70 may include front wall portion 76 that folds up from a first position, disposed over top seat portion 78, to a second position approximately perpendicular or obliquely situated relative to seat portion 78. In the second position, front wall portion 76 bounds a cavity delimited between seat-back 77, seat portion 78, and front wall portion 76. Side walls 79 may be made of fabric or netting disposed interconnecting front wall portion 76 and seat-back 77 whereby movement of the front wall portion 76 to the second position deploys sidewalls 79. In this configuration, frame 10 is usable as a cart for transporting goods and items, such as for example groceries, say, or other objects, whereby the use of frame 10 is extended beyond use as a stroller. Additional embodiments of the basket seat portion 70 are contemplated as within scope of this disclosure, including shaped volumes fittable to frame and/or other adapter members as may be devised for the purpose.

Figure 13C:
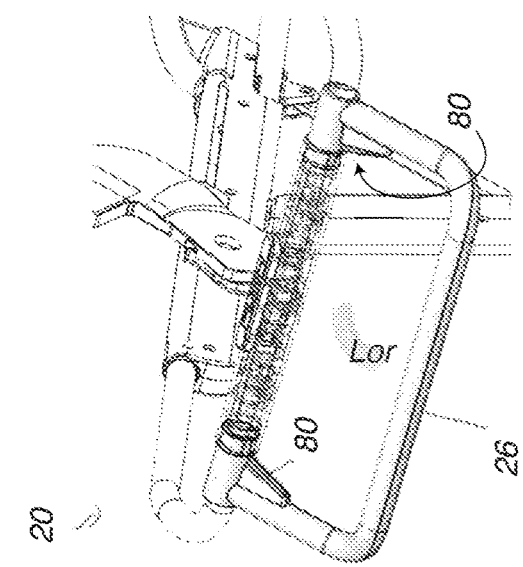
Figure 13B:
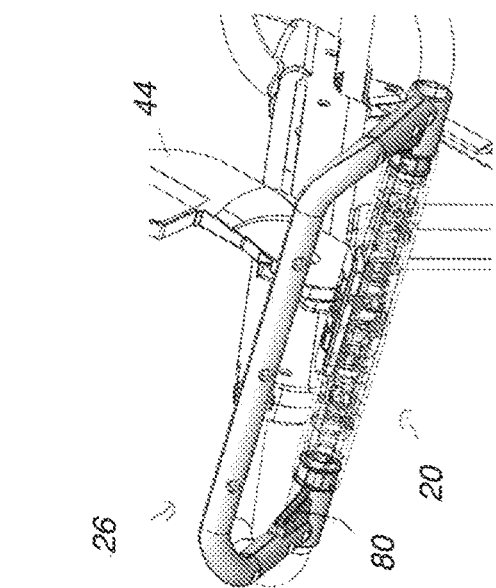
Figure 13A:
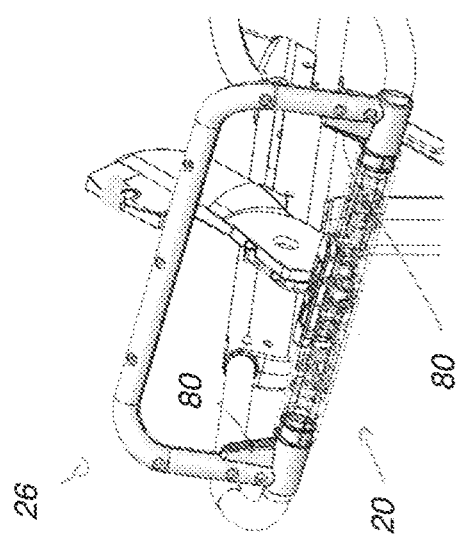

FIG. 13A-FIG. 13C are elevation views of an example embodiment of a rear handle portion 26. Rear handle portion 26 is moveable between a stowed position and a rearward position by means of release buttons 80. Depression of release buttons 80 may enable rotation of the rear handle portion 26 at least between the stowed position and the rearward position. Release of release buttons 80 may immobilize rear handle portion 26. Rear handle portion may be securable at discrete positions between these extremes or selectively anywhere between an arc of rotation by releasing the release buttons whereby the rear handle portion is secured in position.

Figure 14A:
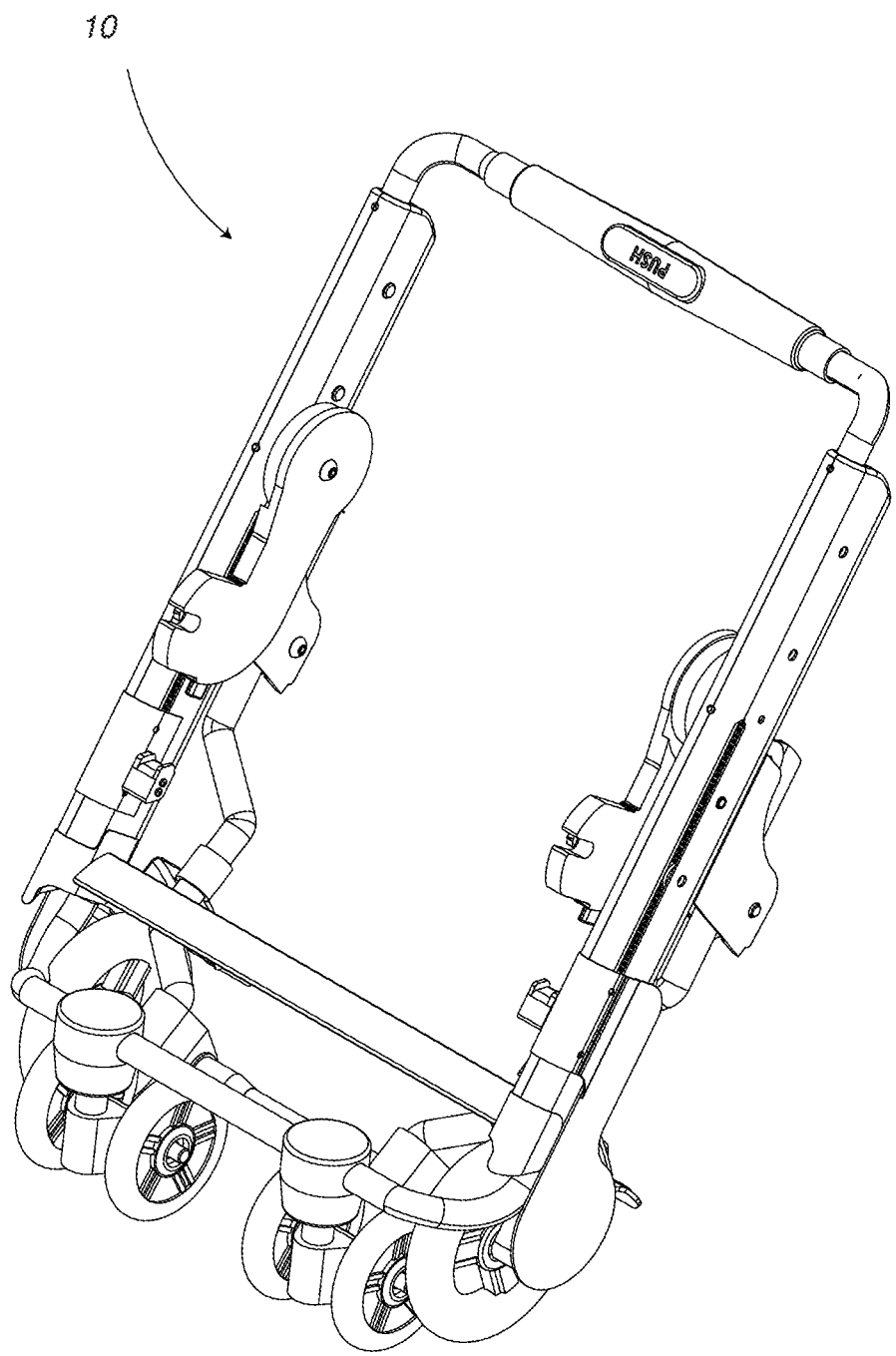
Figure 14C:
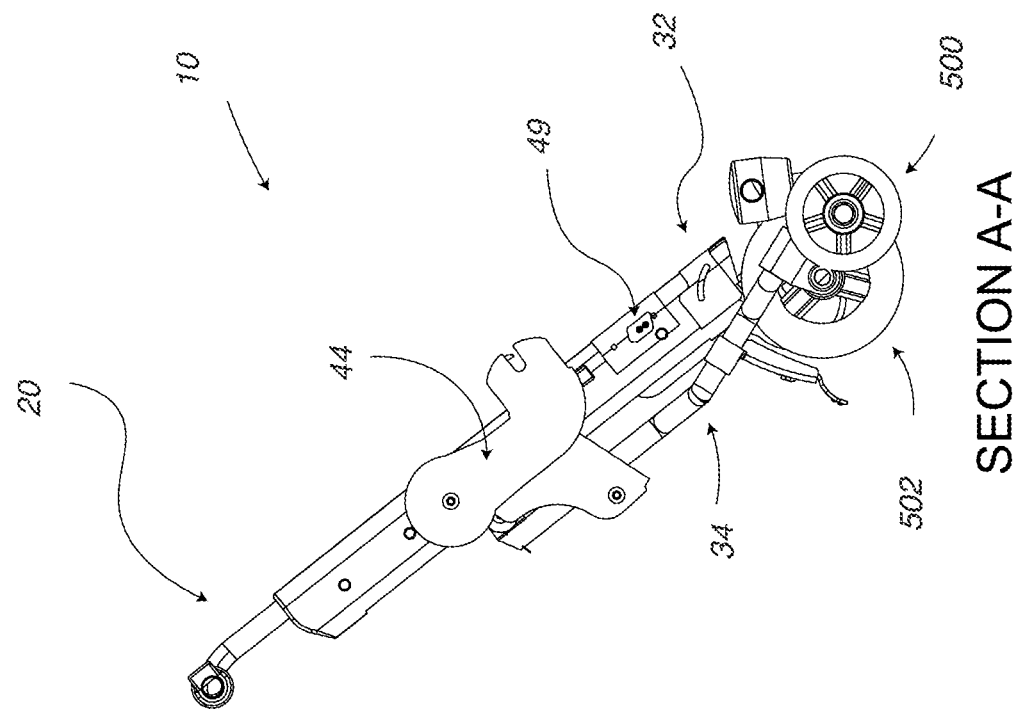
Figure 14B:
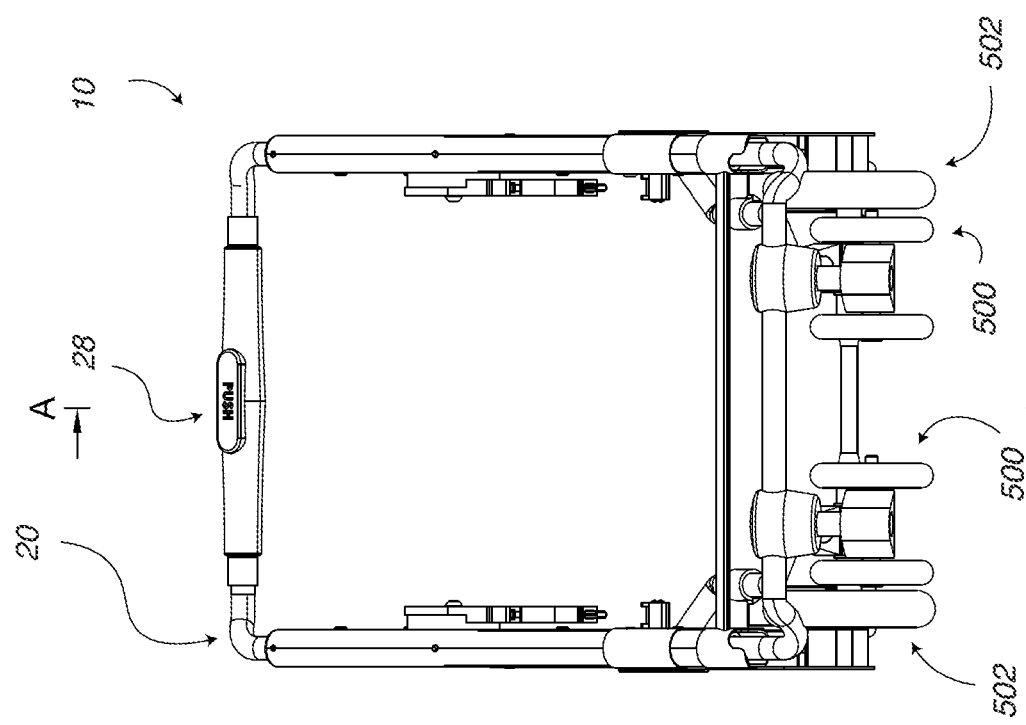
Figure 15A:
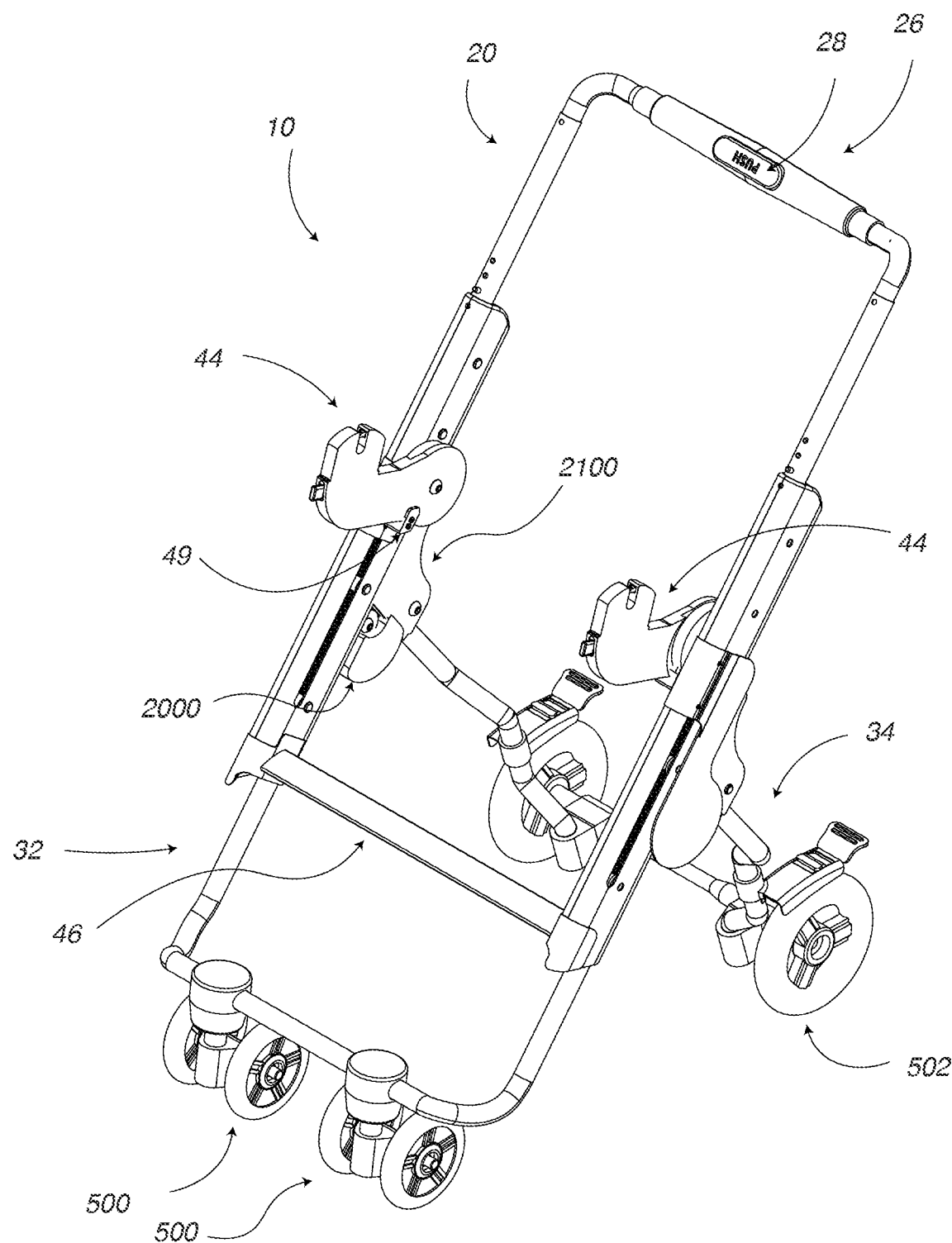
Figure 15C:
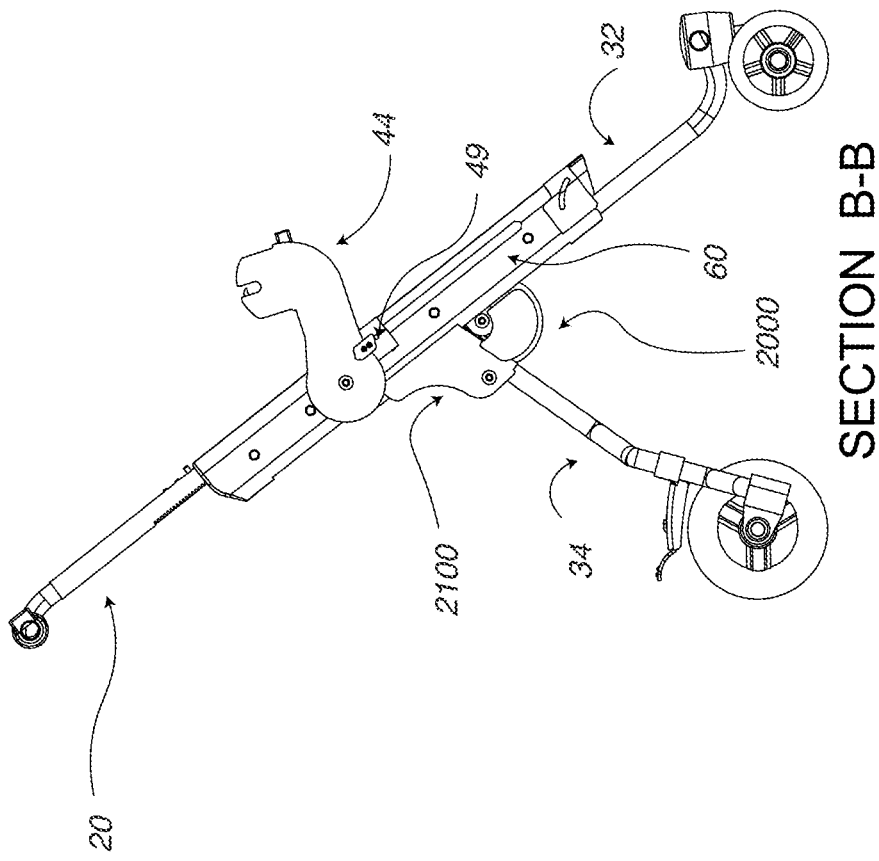
Figure 15B:
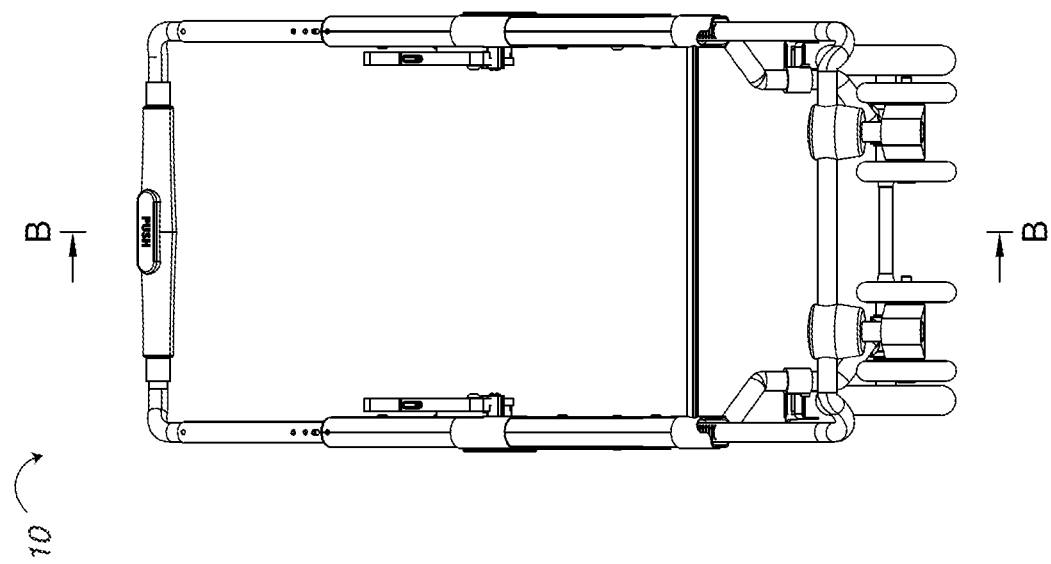

In certain embodiments, as shown in FIG. 14A-FIG. 15C, a folding frame 10 is configured to be placed in a folded configuration as shown in FIG. 14A-FIG. 14C, and in an unfolded configuration as shown in FIG. 15A-FIG. 15C. The embodiments as shown omit the strut member 38 (FIG. 7C-FIG. 7D), wherein the elimination of the strut member 38 allows for a more compact structure. In order to release the folding frame 10 from a folded to unfolded position, a release means, such as a button 28, is disposed on the handle portion 26 of the folding frame. Depressing the button 28 allows the folding frame 10 to be unfolded and placed in an unfolded configuration.

In certain embodiments, the folding frame 10 comprises a rear wheel frame 34 and a front wheel frame 32 which are interconnected at a pivot point 64 wherein the rear wheel frame 34 is configured to be substantially aligned with the front wheel frame 32 when the folding frame 10 is collapsed, and wherein the rear wheel frame 34 is rotated away from the front wheel frame 32 when the folding frame 10 is in a deployed unfolded configuration. Furthermore, a supporting member 49 is configured to slide into position below the supporting bracket 44 when the folding frame 10 is placed in an unfolded configuration. In certain embodiments the supporting member is interconnected with the upper rack member 52 wherein the supporting member 49 translates longitudinally with the motion of the handle 20 as the folding frame 10 is converted between folded configurations and unfolded configurations.

Figure 16A:
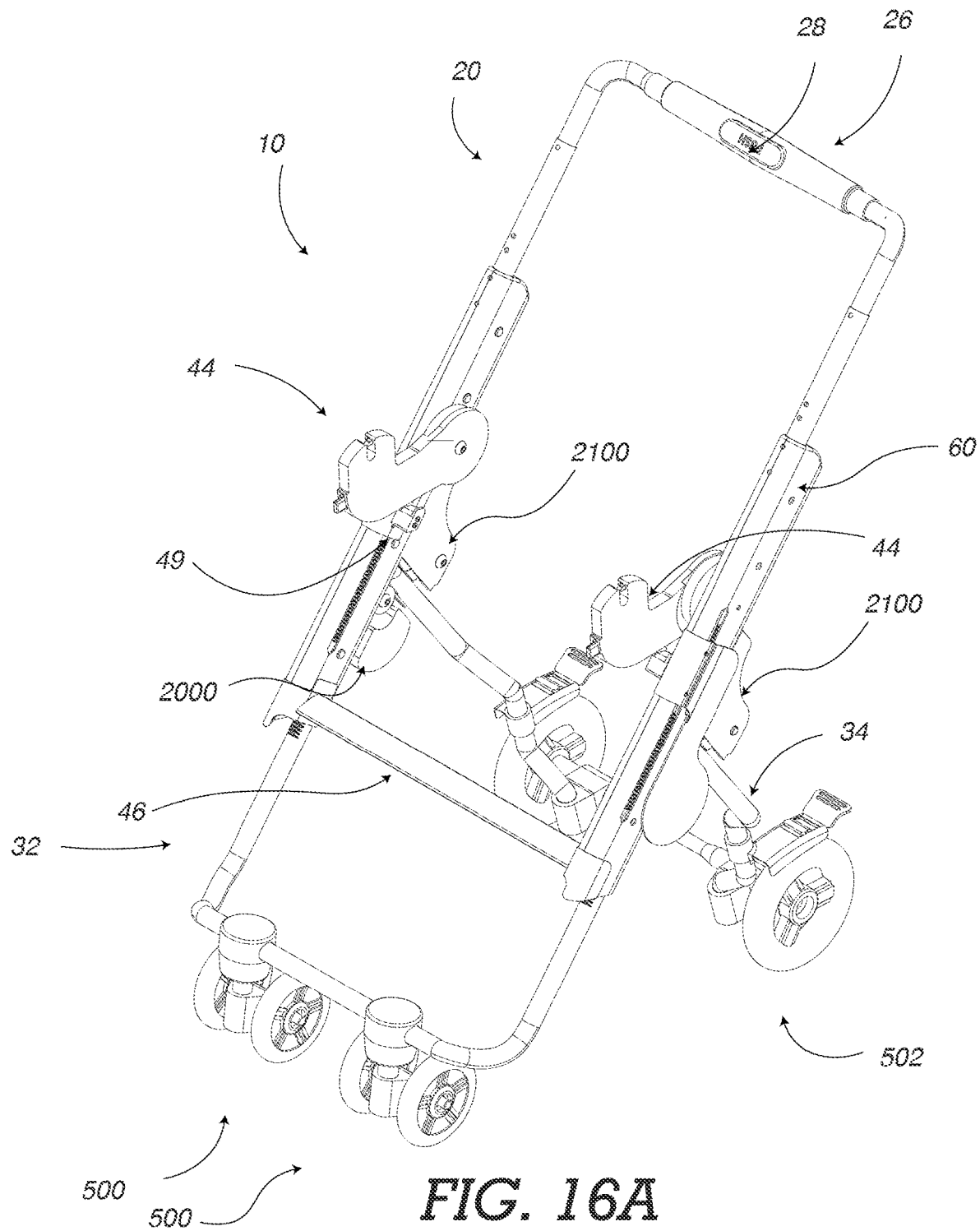
Figure 16C:
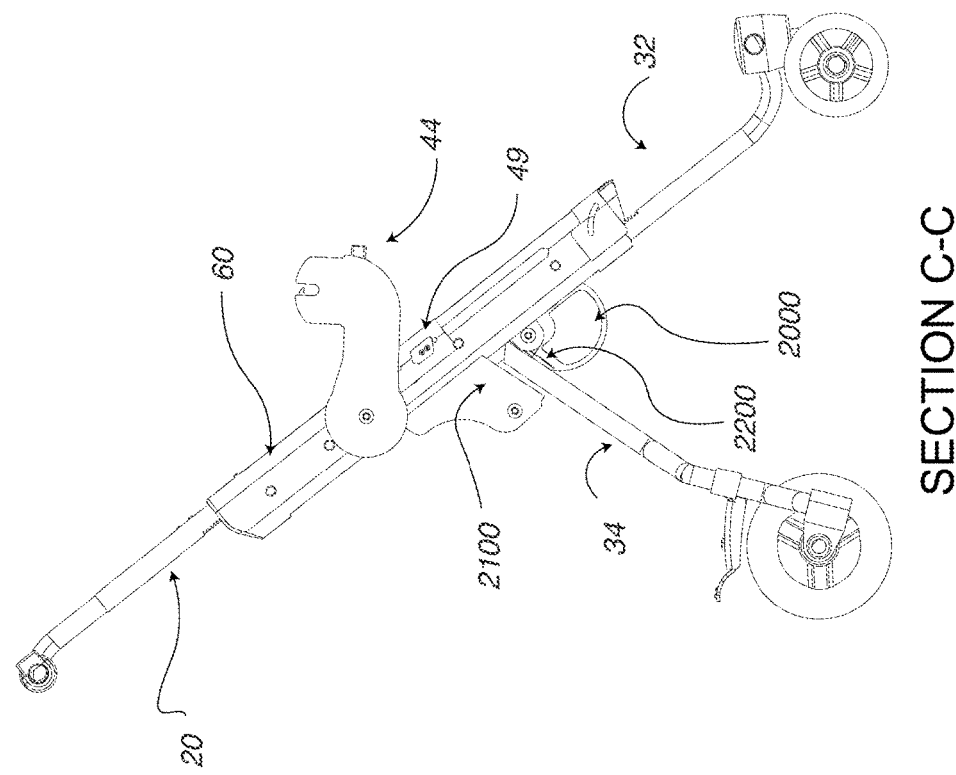
Figure 16B:
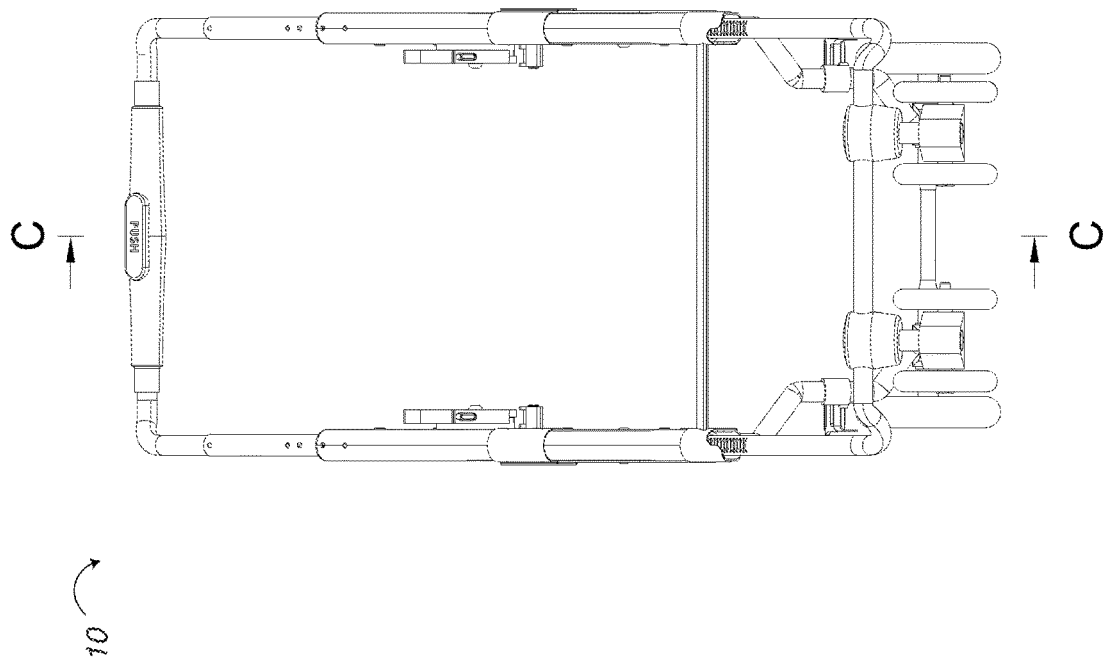

In certain embodiments, shown in FIG. 15A-FIG. 16C, the folding frame 10 comprises a lower clamp element 2000 interconnected with the a lower portion of the upper rack member 52 of the handle frame 22, wherein when the handle frame is deployed outward from the frame 10, the lower clamp element 2000 travels longitudinally upward toward the pivot point 64 wherein the rear wheel frame 34 member is interconnected to the lower rack member 54. In FIG. 15A-FIG. 15C, the folding frame is in a fully deployed and unfolded configuration prepared to be used for transportation purposes. In FIG. 16A-FIG. 16C, the frame is in an intermediate configuration prior to fully deployed to highlight the interaction between the real wheel frame 34, the lower clamp element 2000 and the upper clamp element 2100. When the frame 20 is fully deployed in an unfolded configuration, the lower clamp element 2000 is configured to contact the rear wheel frame and maintain the angle of the rear wheel frame at a predetermined angle from the front wheel frame. Certain embodiments, as shown in FIG. 15A-FIG. 15C, comprises a upper clamp element 2100 statically interconnected to the housing 60, wherein the upper clamp element 2100 is configured to contact the posterior aspect of the rear wheel frame 34 when the rear wheel frame is fully deployed. The upper clamp element 2100 further guides the rear wheel frame 34 between a folded configuration and an unfolded deployed configuration of the folding frame. In certain embodiments a torsion spring 2200 is interconnected to the pivot and is configured to force the rear wheel frame 34 outward away from the front wheel frame 32 when fully deployed. The upper clamp 2100 element provides support wherein the rear wheel frame 34 is clamped between the lower clamp element 2000 and the upper clamp element 2100 in the unfolded configuration when the frame 10 is deployed.

Figure 16E:
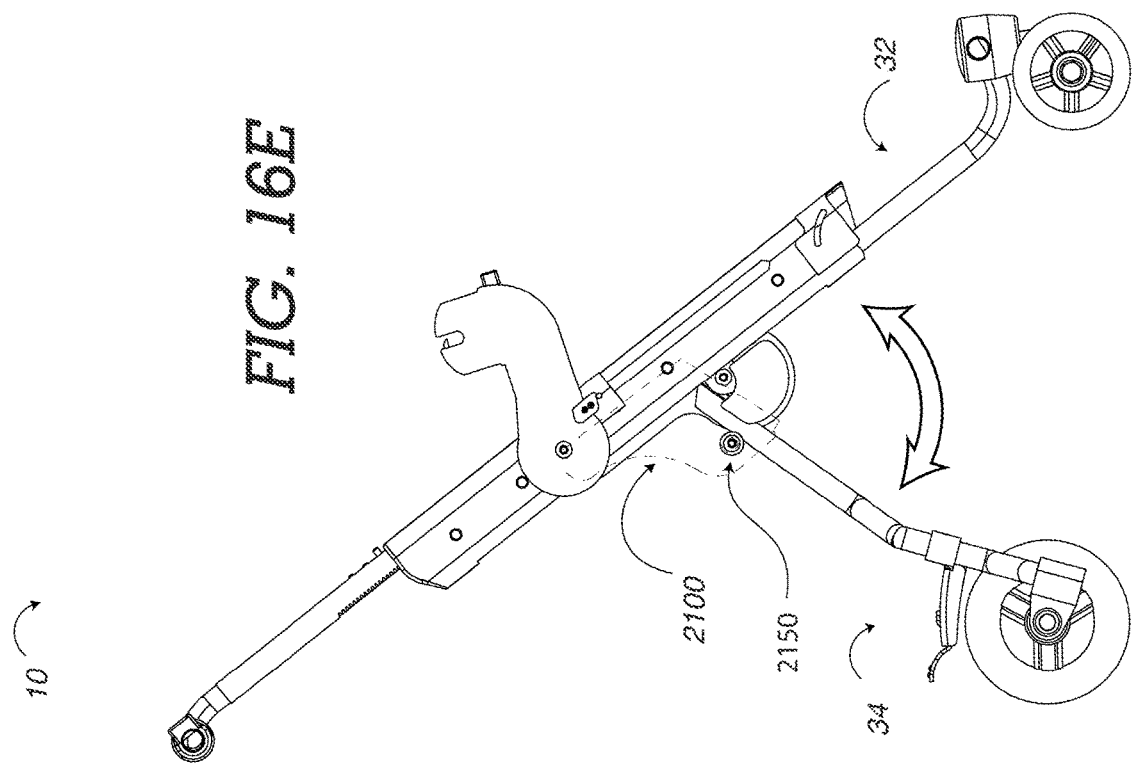
Figure 16D:
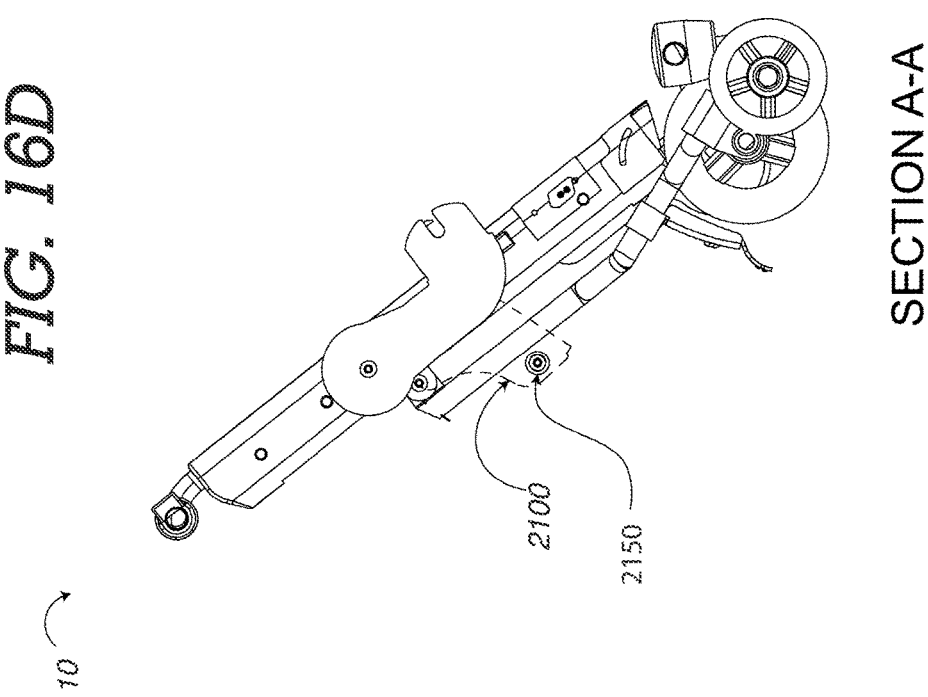

In certain embodiments, as shown in FIG. 16D-FIG. 16E for example, the upper clamp element 2100 comprises a spindle 2150 wherein the lower rack portion 54 is configured to slidably or rollably engage with the spindle 2150. The spindle 2150 guides the rear wheel frame 34 between a folded configuration (FIG. 16E) wherein the rear wheel frame 34 is substantially aligned with the front wheel frame 32. In the context of the present invention, substantially aligned will be understood to mean angularly parallel, aligned with, or there near wherein the folded configuration of the present invention is intended to be compact and result in volumetric profile less than that found in an unfolded configuration (FIG. 16D). In certain embodiments as shown in FIG. 15A-FIG. 16E, the spindle 2150 guides the rear wheel frame 34 to align with the front wheel frame 32 when converting to a folded configuration from an unfolded configuration. Furthermore, the torsion spring 2200 is configured to cause the rear wheel frame 34 to expand angularly away from the front wheel frame 32 as the folding frame 10 is converted from a folded configuration to an unfolded configuration.

Figure 17A:
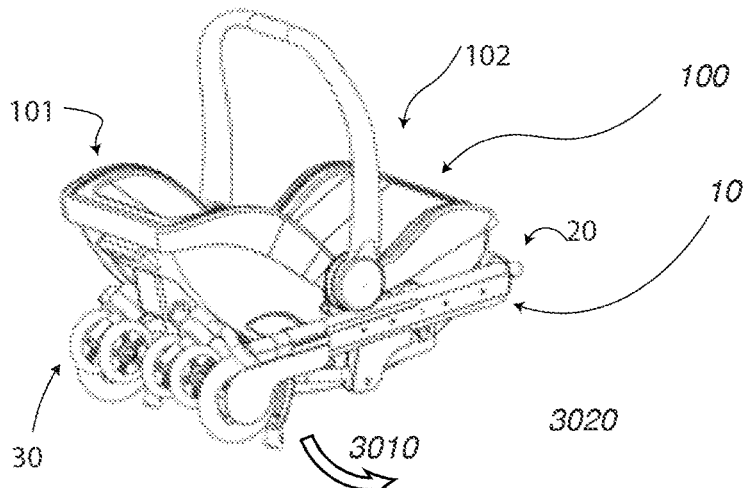
Figure 17B:
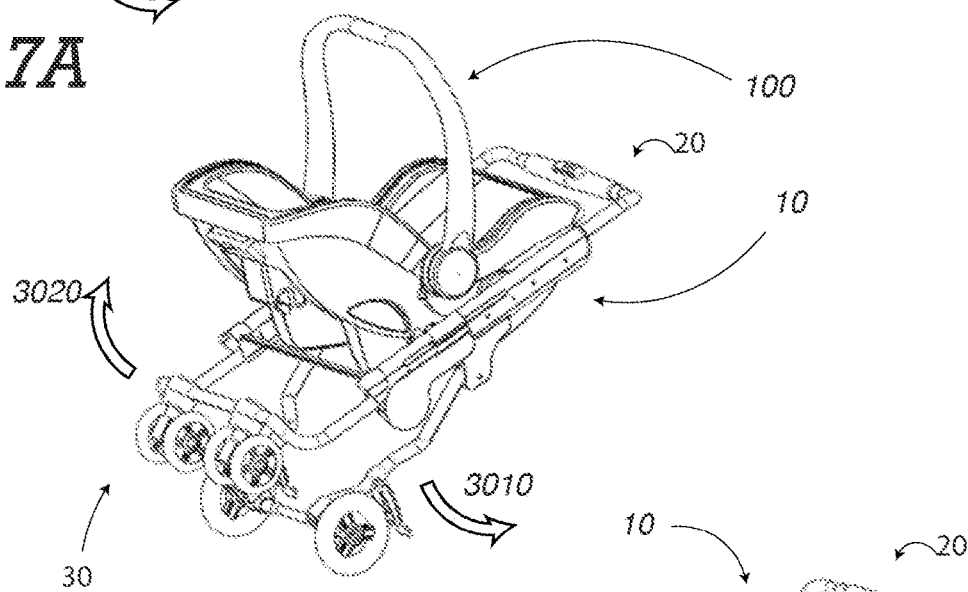
Figure 17C:
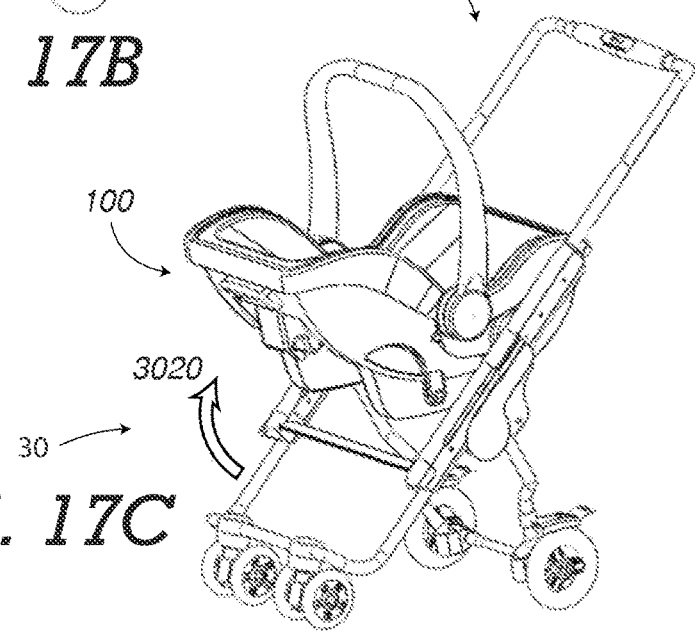

Exemplary embodiments of the present invention are provided for further understanding of the form, function, and actuation of the folding frame 10, in conjunction with a safety seat 100, with a safety seat base 108, and with a vehicle seat 108. FIG. 17A-FIG. 17C demonstrate the folded configuration, an intermediate configuration, and fully deployed configuration of the folding frame 10 interconnected with a safety seat 100. As shown, when the folding frame 10 is in a folded configuration, the handle portion 20 is located adjacent to the head 102 of the safety seat, and the wheelbase 30 is located adjacent to the head 101 of the safety seat. The folding frame is configured to rotate in a first direction 3010 in relation to a safety seat 100 interconnected thereto when converting from folded configuration to the unfolded configuration, and wherein the frame is configured to rotate in a second direction 3020 in relation to the safety seat 100 when the folding frame is converted from the unfolded configuration to the folded configuration.

Figure 18A:
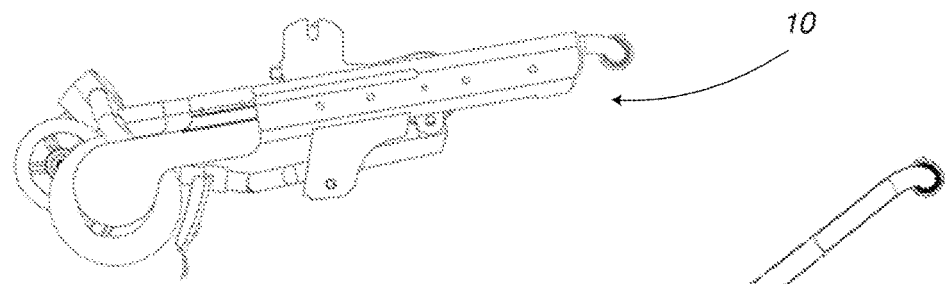
Figure 18B:
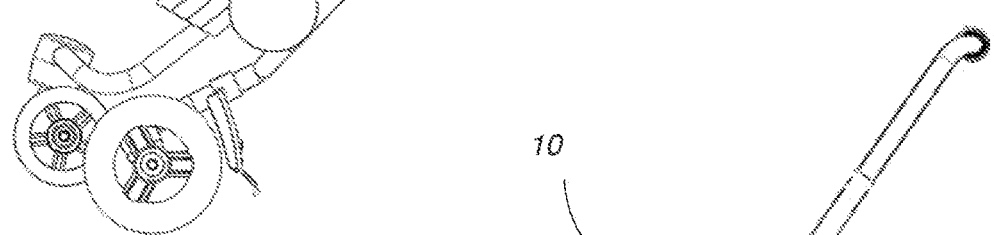
Figure 18C:
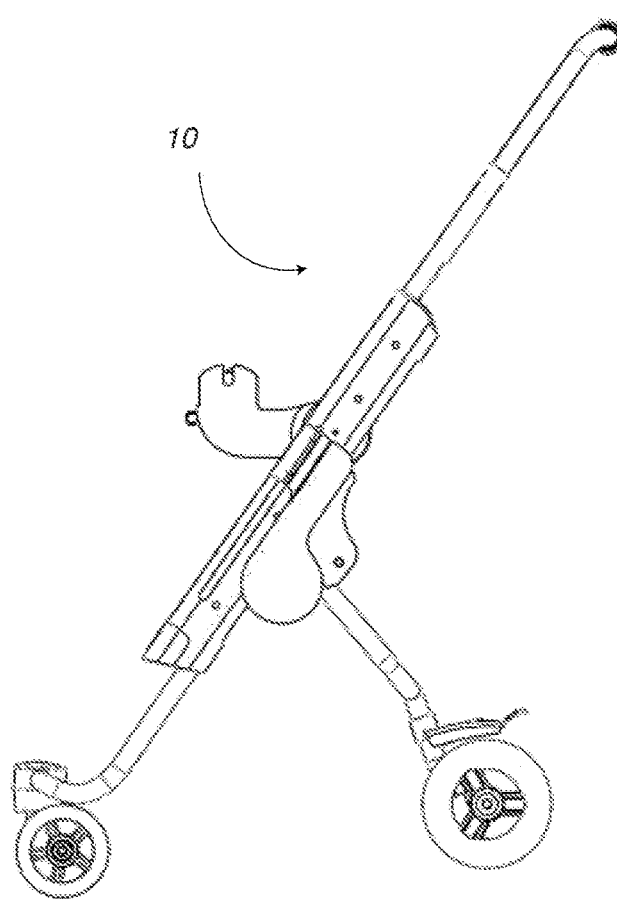
Figure 19A:
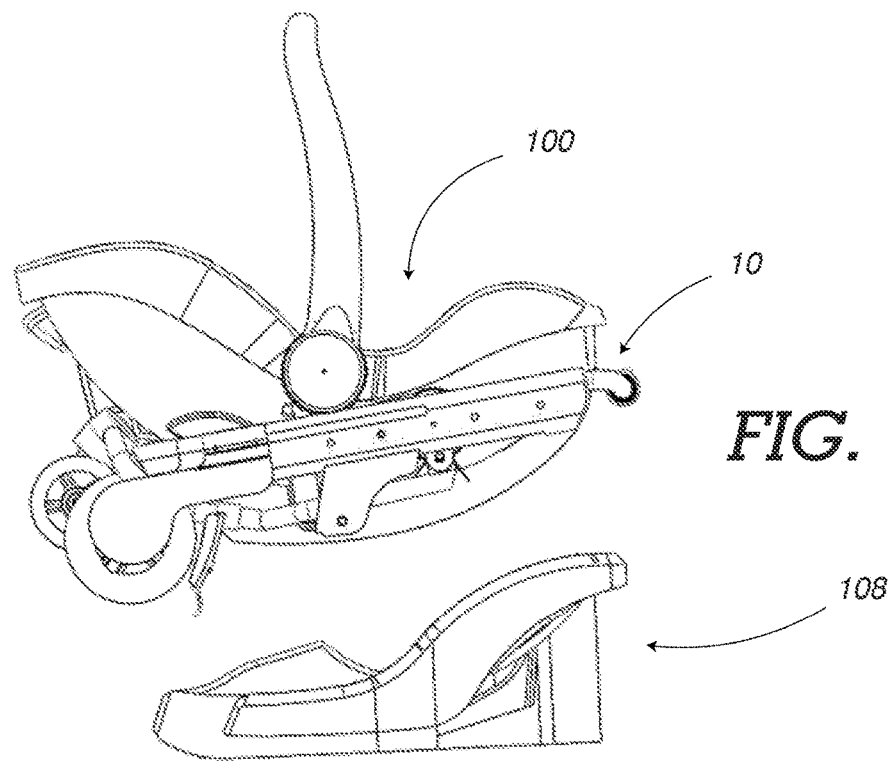
Figure 19B:
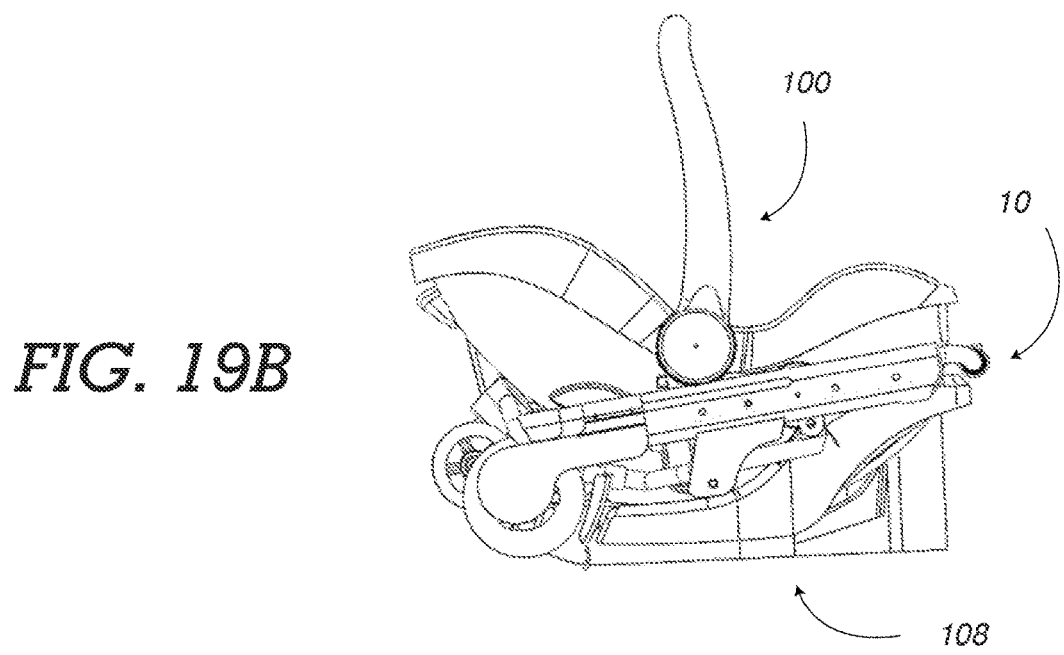
Figure 20:
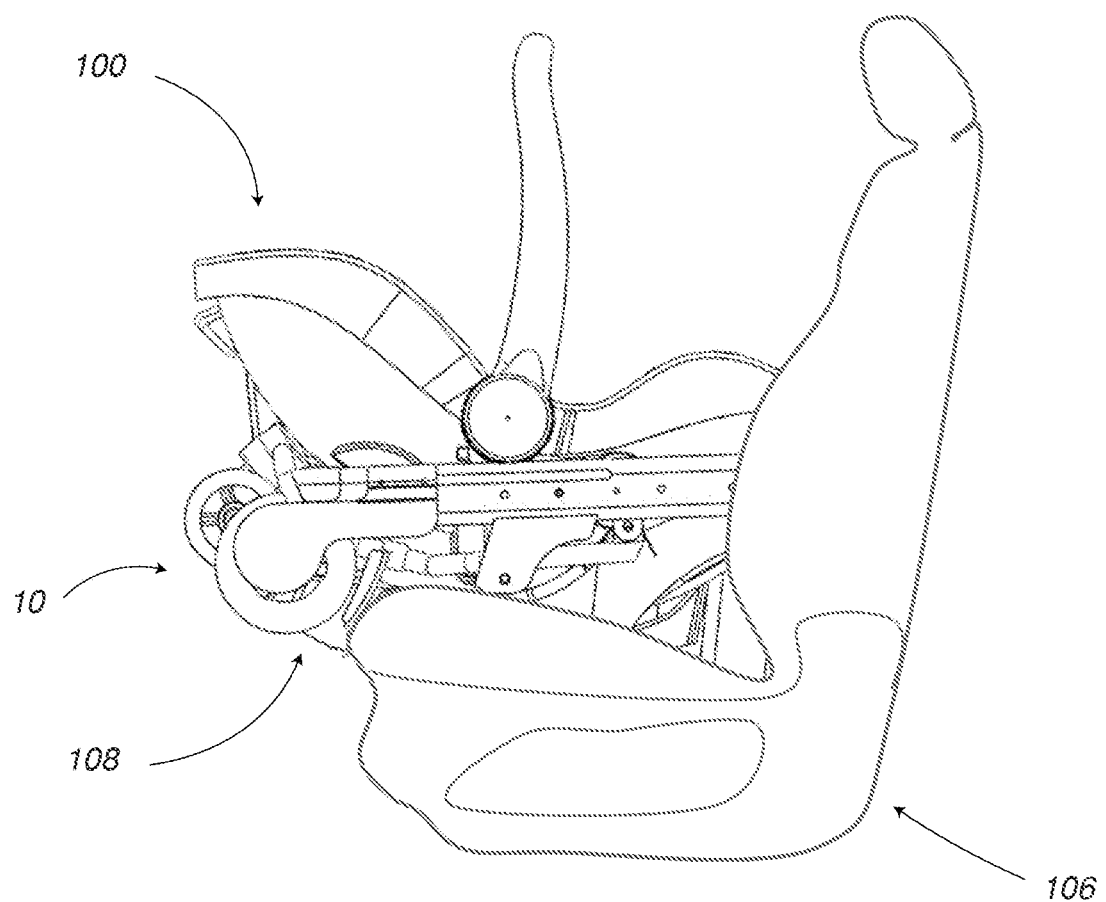
Figures 21A, 21B:
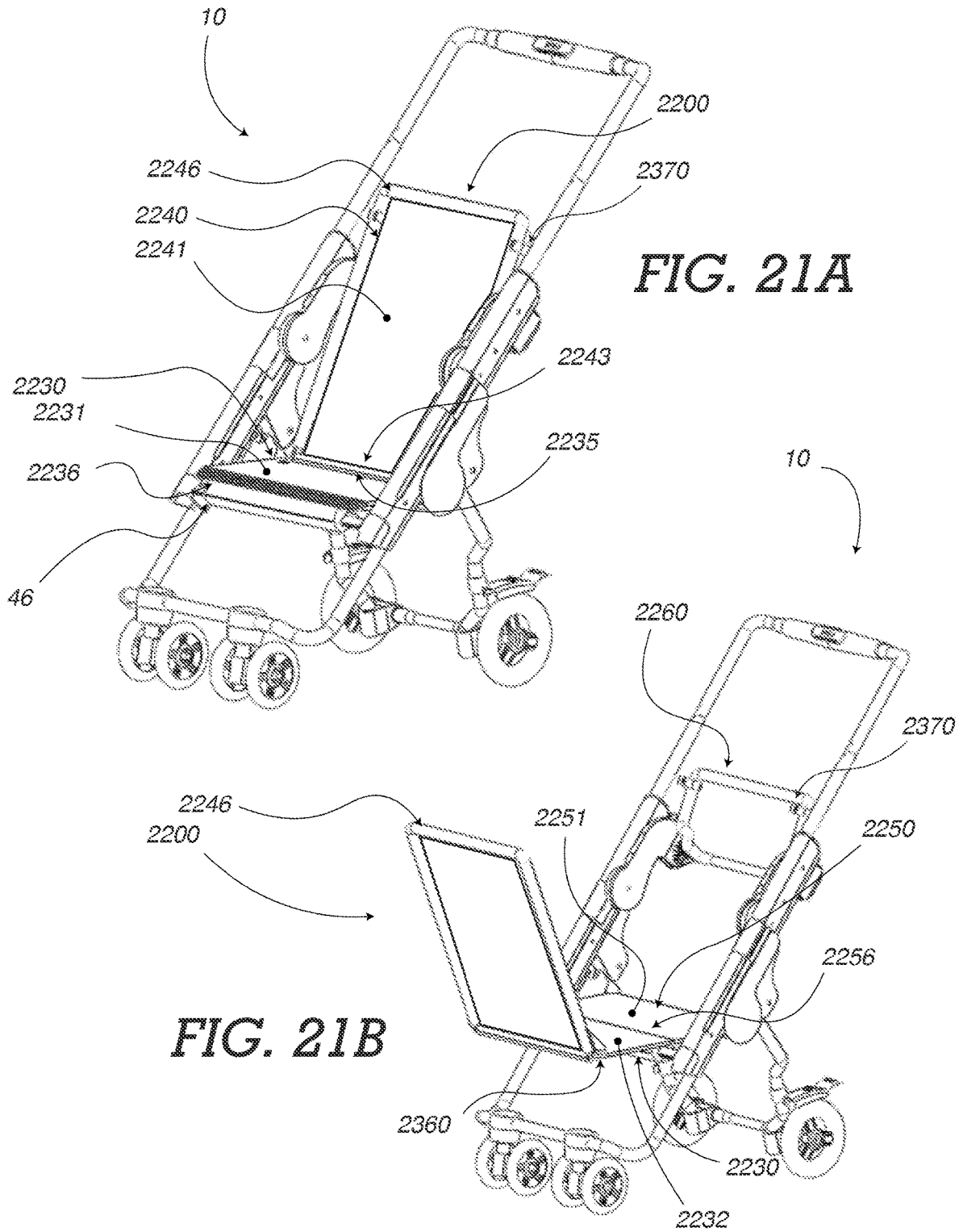
Figure 21C:
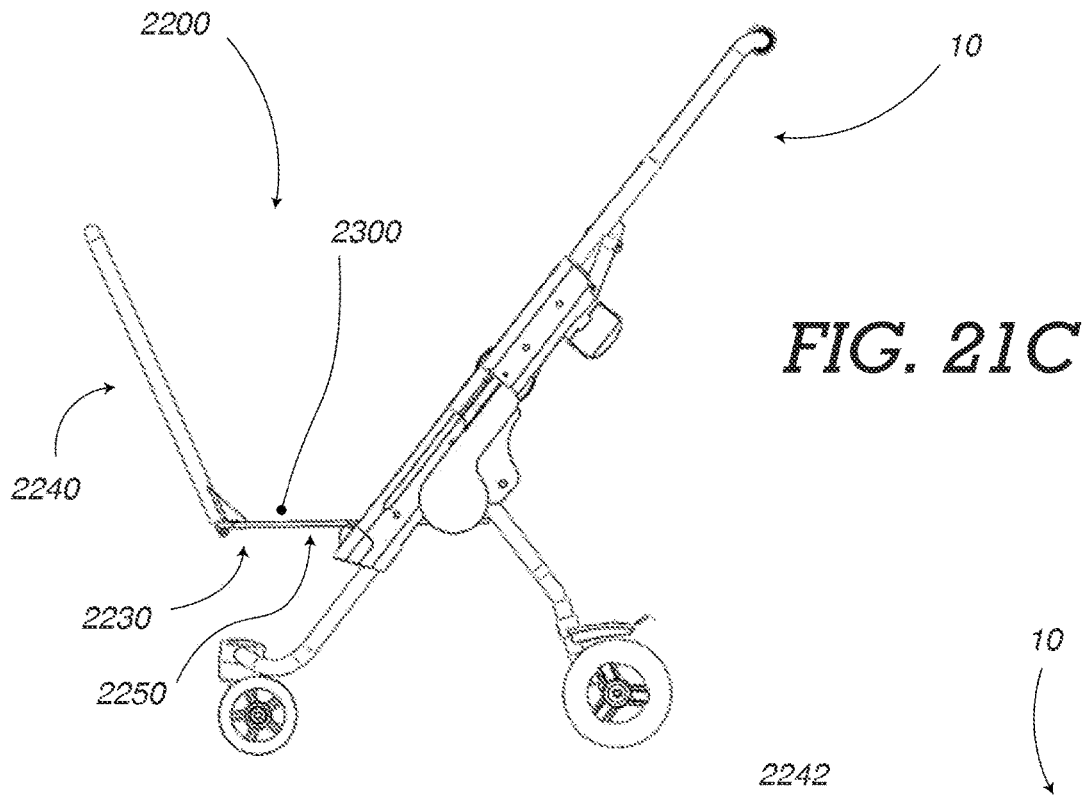
Figure 21D:
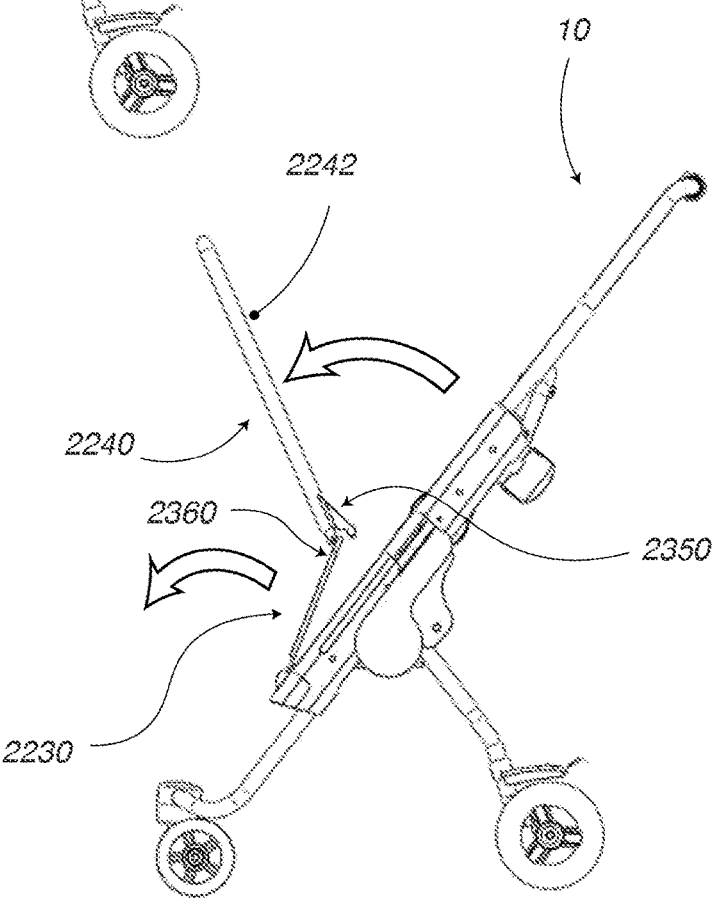

FIG. 18A-FIG. 18C demonstrate the folded configuration, an intermediate configuration, and fully deployed configuration of the folding frame 10. FIG. 19A-FIG. 19B demonstrate the interconnection of the assembly shown in FIG. 17A to a safety seat base 108, and FIG. 20 demonstrates the interconnection of the assembly of FIG. 19B to a vehicle seat 106.

In certain embodiments of the present invention, shown in FIG. 21A-FIG. 22B for instance, the folding frame 10 can be configured between a seat configuration (FIG. 21A) and a cart configuration (FIG. 21B) for transporting goods. In certain embodiments the folding frame 10 comprises a seat-cart module 2200 configured to be releasably interconnected with the folding frame 10 wherein the seat-cart module 2200 is configured to be alternately configured between a seat configuration and a cart configuration.

In certain embodiments, the seat-cart module 2200 comprises a seat-bottom 2230, and a seat-back 2240 which provide a location for seating. In the seat configuration, the seat-back 2240 comprises a first side 2241 for a user to rest their back upon, and the seat-bottom 2230 comprises a first side 2231 for sitting upon. The inferior aspect 2243 of the seat-back is hingedly interconnected with the posterior aspect 2235 of the seat-bottom. Furthermore, an anterior aspect 2236 of the seat-bottom is hingedly interconnected to an anterior aspect 2256 of a base portion 2250. The base portion 2250 of certain embodiments is configured to remain static when the seat-cart module 2200 is interconnected with the folding frame 10, but is not limited thereto.

Figure 22A:
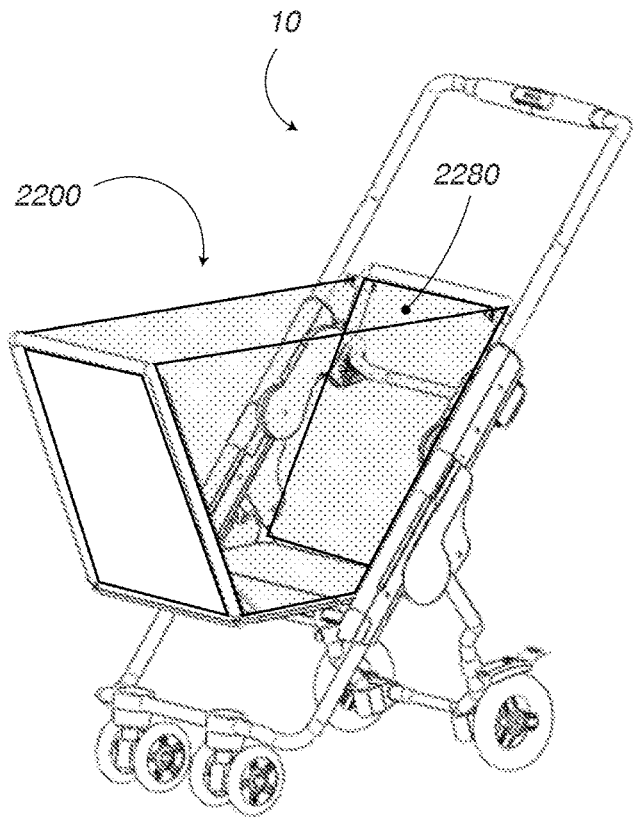
Figure 22B:
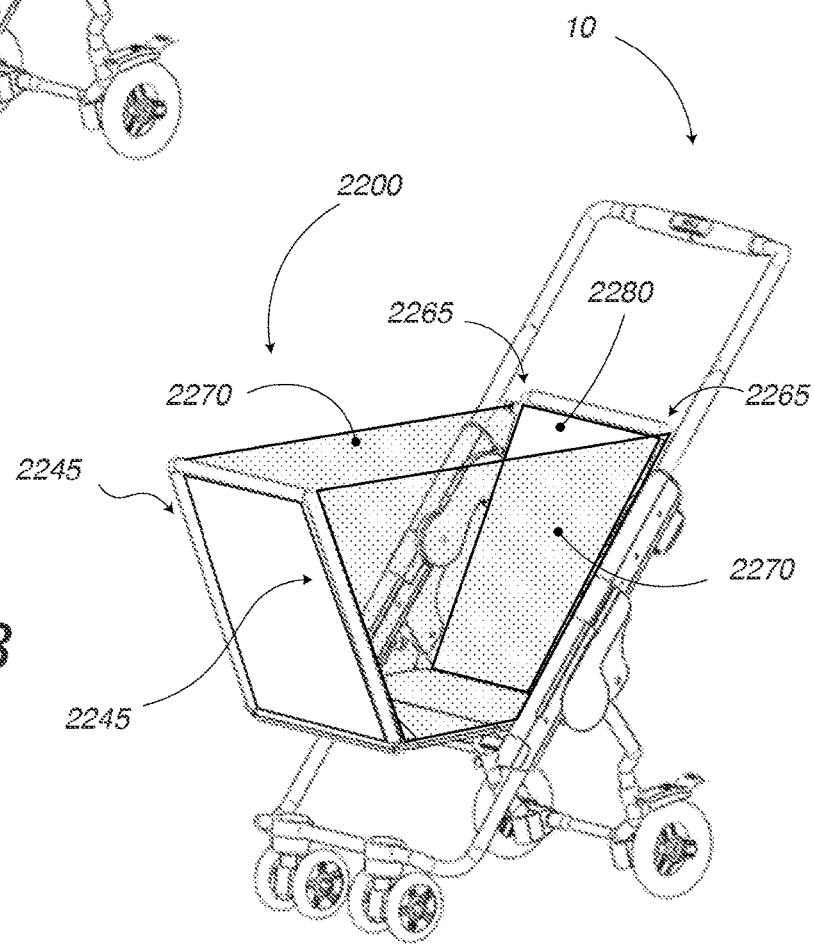

In order to transition the seat-cart module 2200 from a seat configuration to a cart configuration, as shown in FIG. 21A-FIG. 21D for instance, the seat-bottom 2230 is rotated forward (FIG. 21D) in relation to the folding frame 10, and the seat-back 2230 is hingedly rotated forward (FIG. 21D) in relation to the seat-bottom 2230. In certain embodiments the seat-bottom 2230 is rotated in a forward direction 180-degrees between the seat configuration and cart configuration, however embodiments wherein the seat-bottom 2230 rotates more than or less than 180-degrees are within the spirit and scope of the present invention. Furthermore, in certain embodiments, the seat-back 2240 rotates in a forward direction 54-degrees between a seat configuration and a cart configuration, however embodiments wherein the seat-back 2240 rotates more than or less than 54-degrees are within the spirit and scope of the present invention. The resulting configuration provides a contiguous cart-bottom 2300 comprising a second side 2232 of the seat-bottom and a first side 2251 of a base. The seat-back 2240 comprises an anterior side-wall of the cart with the first surface 2241 facing outwards, and a rear support 2260 comprises a posterior side of the cart. In certain embodiments the rear support 2260 comprises a structure to which fabric or mesh is interconnected thereto (FIG. 22A) while in further embodiments the rear support 2260 further comprises a panel (FIG. 22B). Furthermore, material may be drawn between the lateral aspects 2245 of the seat-back and the lateral aspects 2265 of the rear support to comprise the lateral sides of the cart. The sidewalls 2270 drawn between the seat-back 2240 and the rear support 2260 can be selected from materials which are thin and flexible such as mesh, fabric mesh, textiles, netting, polymeric membrane, but are not limited thereto. Examples shown, such as in FIG. 22A comprise sidewalls 2270, and a posterior side 2280 each comprising a mesh or fabric material. Alternate embodiments, such as shown in FIG. 22B comprise a posterior side 2280 comprising a rigid or semi-rigid panel, whereas the sidewalls 2270 comprise a fabric or mesh material. The materials of the sidewalls 2270 are adapted for collapsibly and compactly storing within the seat-cart module when placed in a seated configuration. In certain embodiments the sidewalls 2270 are configured to be stowed between the seat-bottom 2230 and the base portion 2250, and/or between the seat-back 2240 and the rear-support 2260. The embodiments as shown in FIG. 22A-FIG. 22B are not limiting but illustrate only two of many embodiments for cart wall configurations which can be modified as desired while remaining within the spirit and scope of the present invention.

As illustrated in FIG. 21A-FIG. 21D, certain embodiments comprise a seat-cart module 2200 configured to interconnect to the folding frame 10. In certain embodiments the seat-cart module 2200 interconnects with the frame through interconnection with the front frame member 46 and interconnection with the adaptor member 66 and/or the bracket members 44. While embodiments showing such interconnection points with the folding frame 10 are shown, interconnections between the seat-cart module and the folding frame are not limited thereto.

In certain embodiments the second side 2242 of the seat-back comprises a protuberance 2350 at the inferior aspect 2243 wherein the protuberance 2350 is configured to mate with a slot 2360 in the second side 2232 of the seat-bottom for increased support between the anterior side of the cart and the cart-bottom.

In certain embodiments a rear support 2260 is interconnected with the support brackets 44 wherein the rear support 2260 provides support for the seat-back 2240 in the seat configuration, and wherein the rear support 2260 provides structural support and interconnection point for the posterior side 2280. In certain embodiments the rear support 2260 further comprises retention devices such as clips 2370 which are configured to releasably interconnect with a tubular frame portion 2246 of the seat-back 2240 to constrain the seat-back 2240 in the seat configuration and prevent the inadvertent rotation of the seatback 2240 forward.

In certain embodiments, as shown in FIG. 23A-FIG. 23B for instance, the handle portion 20 is expendably adjustable in relation to the upper rack member 52 wherein the handle portion 20 is telescopically interconnected with each of the upper rack member 52. Thus, the height of the handle portion 20 can be adjustably configured in relation to the needs of the user.

Figure 24A:
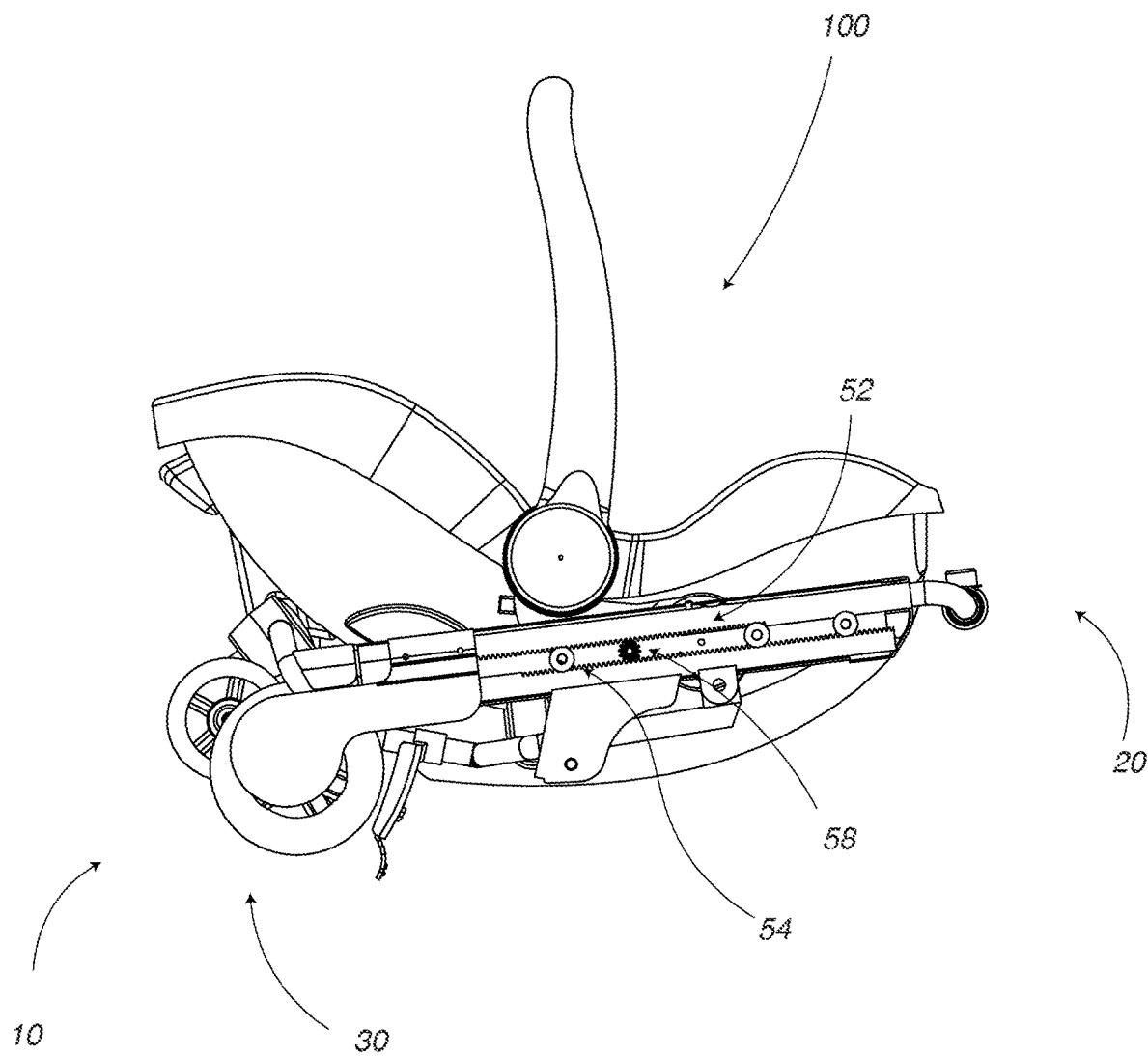
Figure 24B:
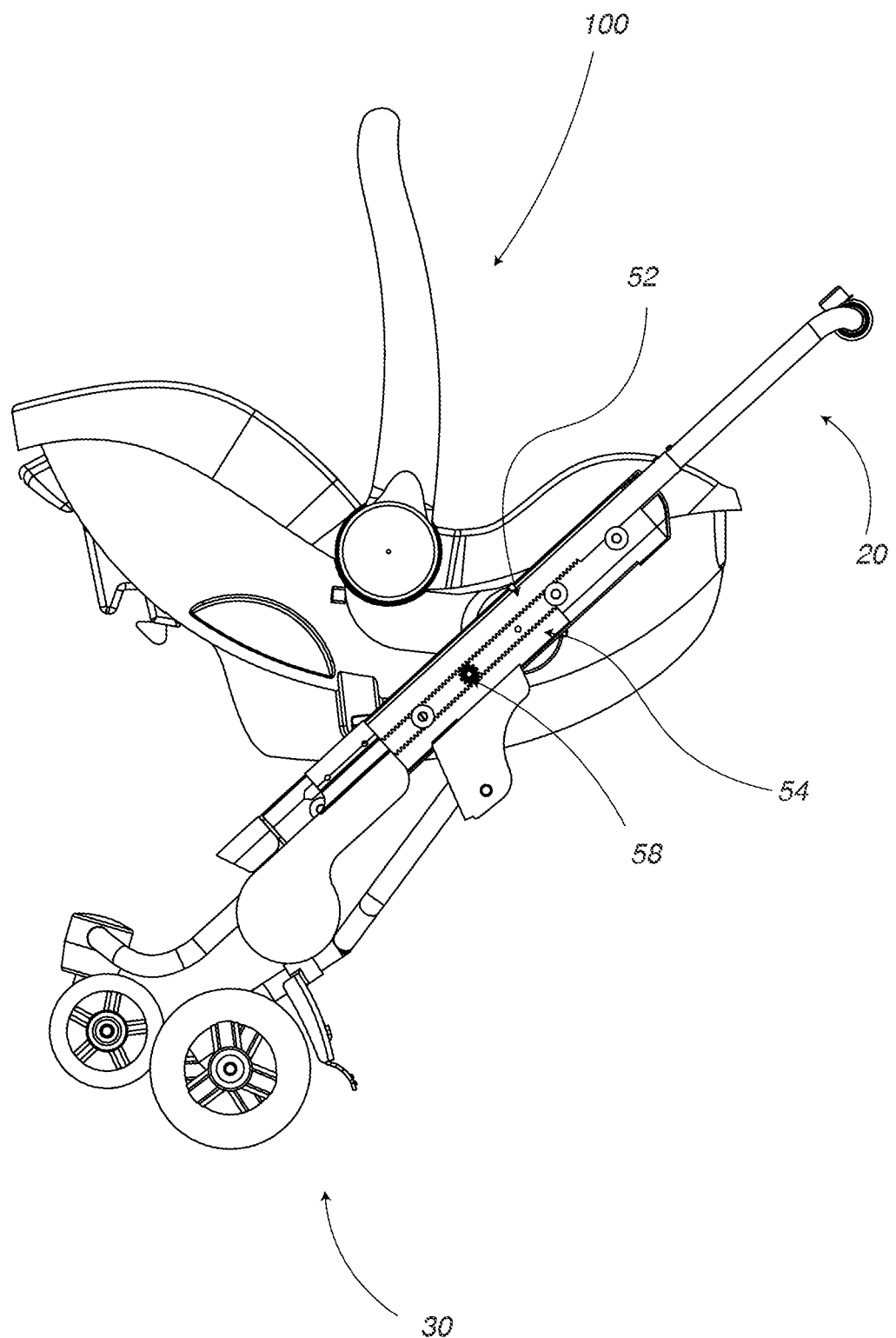
Figure 24C:
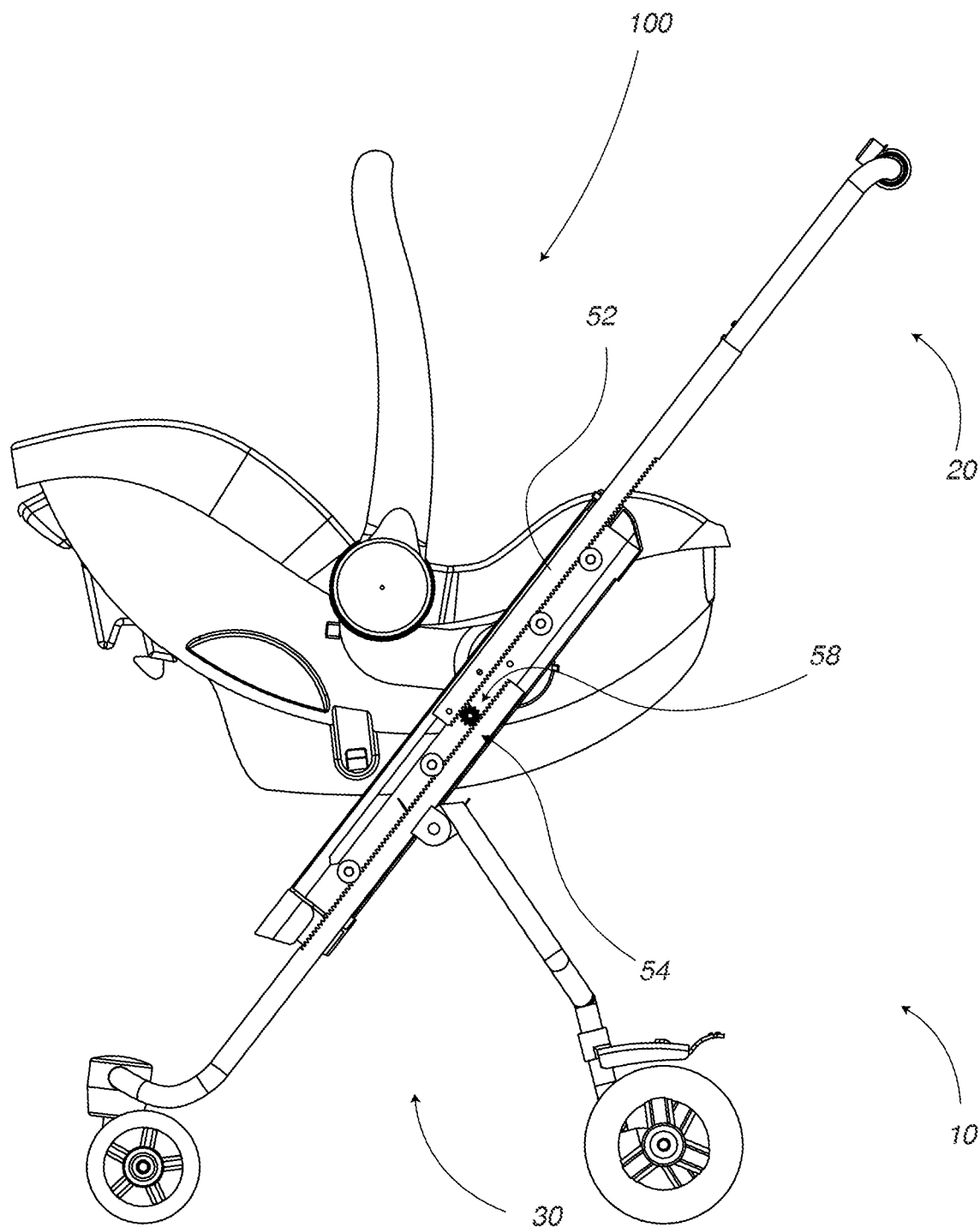

Certain embodiments of a folding frame 10, as shown in FIG. 24A-FIG. 24C, are configured to be interconnected with a safety seat 100 wherein the folding frame 10 is configured to convert from a folded position (FIG. 24A) to an unfolded position (FIG. 24C) while remaining interconnected with the folding frame 10. In FIG. 24A-FIG. 24C, the rack and pinion mechanism is shown in a semi-transparent view to demonstrate the function and operability of the rack and pinion mechanism. As shown, the safety seat 100 is interconnected to the folding frame 10 through the use of support brackets 44 which are configured to rotate in relation to the folding frame 10.

While various embodiments of the present invention have been described in detail, it is apparent that modifications and alterations of those embodiments will occur to those skilled in the art. However, it is to be expressly understood that such modifications and alterations are within the scope and spirit of the present invention. Further, the inventions described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A stroller comprising:
   a handle portion;
   a wheelbase comprising a plurality of wheels configured to allow the rolling of the stroller along a surface;
   a seat-cart module interconnected to the stroller, a seat-bottom interconnected to the stroller, and a seat-back interconnected to the stroller,
   an anterior aspect of the seat-bottom is hingedly interconnected with a base portion, and an inferior aspect of the seat-back is hingedly interconnected with a posterior aspect of the seat-bottom;
   wherein in a seat configuration the seat-bottom and seat-back are configured for seating, and a first side of the seat-bottom is directed upward,
   wherein in a cart configuration a second side of the seat-bottom is directed upward, the seat-bottom is contiguous with the base portion to result in a cart-bottom, and the seat-back comprises an anterior side-wall of the cart.

2. The stroller of claim 1, further comprising a rear support which interconnects with the stroller wherein the rear support is configured to support the seat-back in place when the stroller is in the seat configuration.

3. The stroller of claim 2, wherein the rear support is removably interconnected to the stroller through attachment to a first support bracket interconnected to a first lateral aspect of the stroller, and a second support bracket interconnected to a second lateral aspect of the stroller.

4. The stroller of claim 2, further comprising:
   a first sidewall interconnected between a first lateral aspect of the seat-back and a first lateral aspect of the rear-support,
   a second sidewall interconnected between a second lateral aspect of the seat-back and a second lateral aspect of the rear-support,
   wherein the sidewalls are drawn between the seat-back and the rear-support when stroller is in the cart configuration.

5. The stroller of claim 4, wherein the sidewalls comprise a flexible material adapted to extend between the back-rest and the rear support in the cart configuration, and collapse in the seat configuration.

6. The stroller of claim 5, wherein the sidewalls comprise a mesh material.

7. The stroller of claim 4, wherein the rear support comprises retention features configured to constrain the seat-back in the seat configuration to prevent the inadvertent rotations of the seatback forward.

8. The stroller of claim 7, wherein the retention features comprise clips adapted for constraining a frame portion of the seat-back frame.

9. The stroller of claim 8, wherein the frame portion of the seat-back comprises a tubular frame.

10. The stroller of claim 4, wherein the handle portion and the wheelbase are adapted to be collapsibly retracted inward to a folded configuration.

11. The stroller of claim 10, wherein the handle portion and the wheelbase are interconnected with a rack and pinion system wherein the retraction of one of the handle portion and the wheelbase, results in the retraction of both the wheelbase and the handle portion, and wherein the extension of the one of the handle portion and the wheelbase, results in the extension of both the wheelbase and the handle portion.

12. The stroller of claim 2, wherein a second side of the seat-back comprises a first protuberance located at an inferior aspect of the seat-back, wherein the first protuberance is configured to mate with a first slot in the second side of the seat-bottom for increased structural support.

13. The stroller of claim 12 further comprising a second protuberance and a second slot, wherein the first protuberance is located on a first lateral aspect of the seat-back, and the first slot is located on a first lateral aspect of the seat-bottom, and wherein the second protuberance is located on a second lateral aspect of the seat-back, and the second slot is located on a second lateral aspect of the seat-bottom.

* * * * *